(12) United States Patent
Otani et al.

(10) Patent No.: US 7,193,626 B2
(45) Date of Patent: Mar. 20, 2007

(54) DEVICE AND METHOD FOR DISPLAYING STEREO IMAGE

(75) Inventors: Hitoshi Otani, Tokyo (JP); Nobuo Kochi, Tokyo (JP); Hiroyuki Aoki, Tokyo (JP); Mitsuharu Yamada, Tokyo (JP); Hirokazu Sato, Tokyo (JP)

(73) Assignee: Topcon Corporation, Tokyo (JP)

( * ) Notice: Subject to any disclaimer, the term of this patent is extended or adjusted under 35 U.S.C. 154(b) by 737 days.

(21) Appl. No.: 10/383,260

(22) Filed: Mar. 7, 2003

(65) Prior Publication Data

US 2003/0174204 A1    Sep. 18, 2003

(30) Foreign Application Priority Data

Mar. 8, 2002    (JP) ............................... 2002-064094
Mar. 20, 2002  (JP) ............................... 2002-077997

(51) Int. Cl.
*G06T 1/00* (2006.01)

(52) U.S. Cl. ...................... 345/418; 382/154
(58) Field of Classification Search ................ 345/419
See application file for complete search history.

(56) References Cited

U.S. PATENT DOCUMENTS

| | | | |
|---|---|---|---|
| 4,863,258 A * | 9/1989 | Greene ........................ 351/201 |
| 5,726,704 A | 3/1998 | Uomori | |
| 6,075,905 A * | 6/2000 | Herman et al. ............. 382/284 |
| 6,276,799 B1 | 8/2001 | Van Saarloos et al. | |
| 6,349,153 B1 * | 2/2002 | Teo ............................ 382/294 |
| 6,549,650 B1 * | 4/2003 | Ishikawa et al. ............ 382/154 |
| 6,765,568 B2 * | 7/2004 | Swift et al. ................. 345/419 |
| 2001/0030715 A1 | 10/2001 | Tabata | |
| 2002/0105514 A1 | 8/2002 | Roche, Jr. | |

FOREIGN PATENT DOCUMENTS

| | | |
|---|---|---|
| EP | 1 089 573 A2 | 4/2001 |
| EP | 1 235 439 A2 | 8/2002 |

\* cited by examiner

*Primary Examiner*—Ulka Chauhan
*Assistant Examiner*—Peter-Anthony Pappas
(74) *Attorney, Agent, or Firm*—Foley & Lardner LLP

(57) ABSTRACT

A stereo image displaying device comprising: a feature element specifying section 40 for specifying feature elements contained in a pair of stereo images taken with a stereo image taking section 10; an image controlling section 30 for controlling the stereo images based on the positions of the specified feature elements in the stereo images to provide finished stereo images; and a displaying section 60 for displaying the finished stereo images in stereovision.

6 Claims, 19 Drawing Sheets

LEFT IMAGE

RIGHT IMAGE

LEFT IMAGE

RIGHT IMAGE

IMAGES THAT CANNOT BE SEEN IN STEREOVISION

LEFT IMAGE    RIGHT IMAGE

DEVICE AND METHOD FOR DISPLAYING STEREO IMAGE

DETAILED DESCRIPTION OF THE INVENTION

1. Field of the Invention

The present invention relates to a stereo image displaying device and method thereof capable of forming a three-dimensional image of a photographed object from stereo-photographed images and displaying the formed image in three dimensions.

The present invention also relates to a stereo image displaying device capable of measuring stereo images from the three-dimensional image formed.

The present invention also relates to a stereoscopic image displaying device and method thereof for use in forming and displaying three-dimensional images of photographed objects from stereo-photographed images, and particularly to such device and method capable of easily performing stereo-viewing for an extended period of time.

2. Description of Prior Art

Conventional stereo cameras for stereo-measurement are secured in position to prevent relative displacement of each camera. Therefore, the base line length corresponding to the camera interval is constant, and so the photographing distance of each camera must be made accurately the same each other. Therefore, the lenses used are not zoom lenses of variable focal length but of fixed focal length. Also, the lenses used are of a high accuracy with less aberration because the measurement accuracy of the stereo camera is determined with the resolution of the camera.

However, the conventional stereo photographing apparatus has the following problems:

1. Inconvenient to carry because each camera is fixed to prevent relative displacement.

2. The size of the object to be measured with the stereo photographing apparatus is limited because of small choosing ranges of the base line length and the photographing distance.

3. Less general public can afford to get and use because the dedicated photographing apparatus using high accuracy lenses is expensive.

The stereo image displaying device for stereo-viewing the stereo-photographed images comes in the liquid crystal shutter type and the liquid crystal filter shutter type. With the liquid crystal shutter type, right and left images are displayed by turns on a single screen, and the images are synchronized and switched using liquid crystal glasses. With the liquid crystal filter shutter type, liquid crystal deflection filters are attached on the image screen to observe right and left images while switching and displaying them and simultaneously switching the liquid crystal deflection filters.

FIG. 1 is a drawing for explaining an overlap portion and a non-overlap portion of a pair of right and left images constituting a stereo image handled with the stereo image displaying device described above. The FIG. 1A shows a state in which right and left images are combined or fused for stereovision. The FIG. 1B shows the regions photographed as the right and left images. Images that can be used for stereovision, as used in the aerial photogrammetry, are converted through inner orientation, relative orientation, and absolute orientation into the state in which dimensions of actual topographical charts and photographed objects can be measured. In each of the pair of right and left images that constitute the stereo image, there are an overlap portion and a non-overlap portion that is present as photographed only on the right or left image. Of those portions, the overlap portion is the subject of stereovision using the stereo image displaying device.

While the above stereo image displaying device makes stereovision possible by switching and displaying with time-division the right and left images using liquid crystal glasses, liquid crystal filters, etc., there are the following problems:

4. Since the switched images are shown to human eyes by time-division for the brain to fuse the right and left images, the switching of right and left images causes flicker, making the stereovision very troublesome associated with fatigue.

5. With the liquid crystal shutter type, since a sensor is used for the right and left switching of the liquid crystal glasses, errors can occur due to noise of fluorescent lights in the right and left switching. Therefore, the stereovision is hard to use under fluorescent lights.

6. With the conventional stereo image displaying device, the non-overlap portions that appear only in the right or left image are photographed to be visible to an operator as the subjects of stereovision. Then, the operator viewing the stereovision sees simultaneously the overlap portions, the subject of stereovision, and the non-overlap portions that cannot be perceived as stereovision. This causes problems that the operator complains of flicker, discomfort, and fatigue, making it hard to continue stereo-viewing for an extended period of time.

SUMMARY OF THE INVENTION

The present invention has been made to solve the above problems and its first object is to provide device and method for displaying stereo images that can be perceived in three dimensions using images of digital cameras and digital video cameras.

The second object of the present invention is to provide a stereo image displaying device capable of performing stereo image measurement from the created three dimensional images.

The third object of the present invention is to provide a stereo image displaying device capable of making an operator free from fatigue in stereoscopic viewing of the stereo-photographed images even for an extended period of time.

The fourth object of the present invention is to provide stereo image displaying device and method capable of solving the above problems by arranging that the operator is free from fatigue even after an extended period of stereo-viewing the paired right and left images that are perceived as a stereo image.

As shown in FIG. 2, a stereo image displaying device for achieving the first object, comprises: a feature element specifying section 40 for specifying feature elements contained in a pair of stereo images taken with a stereo image taking section 10, an image controlling section 30 for controlling the stereo images based on the positions, in the stereo images, of the feature elements specified with the feature element specifying section 40, and a displaying section 60 for stereo-displaying the stereo images finished with the controlling.

With the device arranged as described above, since the feature elements contained in the stereo images are specified with the feature element specifying section 40, stereo images can be controlled easily with the image controlling section 30. The controlled stereo images are stereo-displayed on the displaying section 60. It is preferable to provide an image data storing section 20 for storing paired stereo images taken with the stereo image taking section 10 to perform the process of specifying the feature elements with the feature element specifying section 40 using the stereo images stored in the image data storing section 20.

It is preferable to arrange that the feature element specifying section 40 includes a cursor moving means for moving the cursor within an image to indicate the feature elements using the cursor moving means. In this way, the operator can perform the stereo image controlling work easily. The cursor moving means typically includes data entering devices for electronic apparatuses such as a mouse, pointer, touch pad, key switch, etc.

The feature element specifying section 40 is preferably provided with an automatic search processing section 44 that searches feature element candidate images to be the feature elements in the stereo image and moves the cursor to the feature element candidate images, so that the operator can easily perform the stereo image controlling work. To search a feature element candidate image, it is preferable to use typically the correlation coefficient method using a template image. In that case, the image position at which the correlation coefficient is a maximum is the position of the feature element candidate image.

The feature element specifying section 40 is preferably provided with a corresponding point specifying section 42 for the operator to specify the corresponding point on the stereo image, and with a calculation process section 48 for measuring position data of the corresponding point, to facilitate the work of measuring the stereo image in three dimensions.

It is preferable that the image controlling section 30 is arranged to perform further displacement correcting work in the process of the controlling of the stereo images. In that way, the position and tilt of the camera are calculated in the controlling process, and also stereo image measurement can be performed from the three-dimensional image that can be stereo-viewed if right and left images are converted into an image that can be stereo-viewed by the displacement correction work, and if a reference scale is given.

The image controlling section 30 is preferably arranged to give an appropriate scale to the stereo model created to correspond to the stereo image using the photographing base line length of the stereo image taking section 10, so that an approximate size of the photographed object can be presented commensurate with the distance between the stereo image taking section 10 and the photographed object.

As shown in FIG. 2, the stereo image displaying device for achieving the second object is preferably provided with a data entering section 50 for entering data used for determining the dimensions of the feature elements specified as described above. In that way, it is possible to make measurable the actual dimensions of the object photographed into the stereo images from the stereo images with their displacements corrected with the image controlling section 30 so as to be stereo-viewed according to the data entered through the data entering section 50 and used for determining dimensions.

Preferably the data entered through the data entering section 50 include at least one of the position, length, and direction of the feature element, so as to facilitate the controlling process of the stereo image with the image controlling section 30.

As shown in FIG. 3, the stereo image displaying device for achieving the third object is preferably arranged that the displaying section 60 is made to be of a dual display type in which the right and left images, for constituting a stereo image and finished with controlling, are displayed respectively on polarizing displays 662, 664, and put together by the use of a partially reflecting mirror 666, to be perceived as a stereo image as the operator sees the right and left images respectively with the right and left eyes by using a pair of polarizing glasses 668. With the dual display system, since the right and left images are observed simultaneously, the operator can continue the stereo image observation for an extended period of time in a stabilized manner without being affected with external noise conditions such as fluorescent lights and lighting conditions.

A stereo image displaying method for achieving the first object comprises, as shown in FIG. 4, a step (S102) of reading a pair of stereo images taken with the stereo image taking section, a step (S110) of specifying feature elements contained in the paired stereo images, steps (S112, S114) of controlling the stereo images based on the positions of the specified feature elements in the stereo images, and a step (S116) of stereo-displaying the stereo images finished with the controlling.

A stereo image displaying device for achieving the fourth object of the present invention, as shown in FIG. 8, comprises: an outline determining section 45 for determining the outline of an area that is photographed as overlapped in right and left images from the outlines of paired right and left stereo images taken with the stereo image taking section 10, an effective image area extracting section 46 for extracting effective image areas from the stereo images according to the outline of the overlapped area determined with the outline determining section 45, and a displaying section 60 for displaying the effective stereo images extracted with the effective image area extracting section 46 as images that can be perceived as a stereo image.

With the device constituted as described above, the outline of the area that is photographed as overlapped in the paired right and left images for constituting the stereo image is determined with the outline determining section 45. Therefore, it is easy to extract the effective stereo image from the stereo images made with the effective image area extracting section 46. The extracted effective stereo images are stereo-displayed on the displaying section 60. Preferably the image data storing section 20 is provided to store the paired stereo images taken with the stereo image taking section 10, so that the process of determining the outline of the overlapped area in the right and left images by means of the outline determining section 45 can be performed using the stereo images stored in the image data storing section 20.

Preferably the outline determining section 45 is provided with a reference image setting section 452 that sets one of the paired stereo images to be a reference image and the other to be a sub-image, and that sets a boundary area, corresponding to the boundary area set on the reference image, onto the sub-image. Here, the reference image setting section 452 is arranged to handle the image on the side of the preferentially used eye of the operator as the main image, so that either image on the side matching the individuality of the operator can be chosen as the main image to alleviate the burden of stereo-viewing work on the operator.

Preferably the outline determining section 45 is provided with a cursor display controlling section 454 that displays a reference cursor on the reference image and a sub-cursor on the sub-image, and that motion-displays the sub-cursor in positions on the sub-image corresponding to the reference cursor motion-displayed on the main image. When the operator uses the arrangement while paying attention to the reference cursor displayed on the main image, the sub-cursor displayed with the cursor display controlling section 454 on the sub-image is automatically motion-displayed corresponding to the motion-display of the reference cursor. As a result, specifying the feature points, boundary points, etc., can be performed smoothly, for example.

Preferably the outline determining section 45 is provided with a boundary area setting section 456 that, when a boundary area is set on the reference image as specified with the reference cursor, sets a corresponding boundary area on the sub-image according to the boundary area. In this way, the subject area for the stereo-viewing is specified smoothly with the boundary area setting section 456. Therefore, for example, when an overlap portion is to be extracted using the reference cursor displayed on the reference image side, the work of cutting out a certain shape, for example a rectangle, from the corresponding boundary area on the sub-image is facilitated.

Preferably the outline determining section 45 is arranged, when the overlap portion is to be determined, to make the outline corresponding to the left end outline of the right image correspond to the outline of the left image, and to make the outline corresponding to the right end outline of the left image to correspond to the outline of the right image. In this way, the outline of the image on the side to be the reference in determining the overlap portion become clear and the process of determining the overlap portion is made smooth.

Preferably the outline determining section 45 is arranged that, when the boundary of one of paired images constituting the stereo image is specified, the corresponding boundary of the other image is determined by calculation based on the specified boundary. In this way, the boundary is specified automatically and smoothly. Contents of the calculation include for example parallax compensation in right and left images due to differences in altitude and depth of the boundary points, and determination of the overlap portion through correlation process. In the case the overlap portion is determined by the correlation process calculation, the process can be used to determine the corresponding boundary so that as much area as possible that can be stereo-viewed is included, or to cut out an area excluding the area of great image distortion so that stereovision is made in accurate shape.

Preferably the outline determining section 45 is arranged to calculate a specified boundary line by interpolating specified boundary points with respect to one of paired images constituting a stereo image, and to determine by calculation a corresponding boundary line of the other image based on the interpolated, specified boundary line. In this way, the boundary points may be specified at greater intervals and so the operator's work efficiency is enhanced.

Preferably a stereo image displaying method for achieving the fourth object of the present invention as shown in FIG. 9 has: a step (S117) of determining the outline of the area, photographed as overlapped in the right and left images, from the outlines of the paired right and left stereo images, a step (S117*a*) of extracting effective stereo images from the stereo images based on the outline of the determined overlap area, and a step (S117*b*) of displaying the extracted effective stereo images to be perceived in stereovision.

This application is based on Japanese patent applications, No. 2002-064094 filed in Japan on Mar. 8, 2002 and No. 2002-077997 filed in Japan on Mar. 20, 2002, which are entirely incorporated herein by reference.

The present invention will become more fully understood from the detailed description given hereinbelow. However, the detailed description and the specific embodiment are illustrated of desired embodiments of the present invention and are described only for the purpose of explanation.

Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

EMBODIMENTS OF THE INVENTION

Figure 1A:
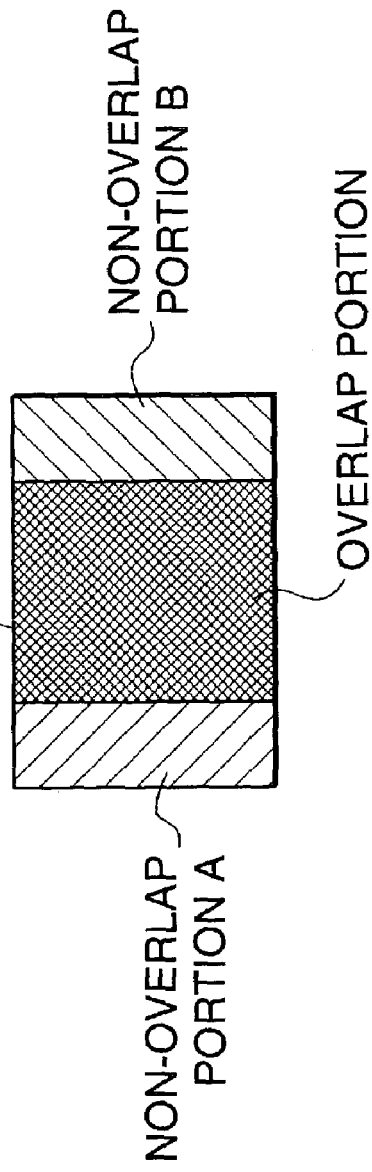
FIGS. 1A and 1B are drawings for explaining the overlap and the non-overlap portions of the right and left images.
Figure 1B:
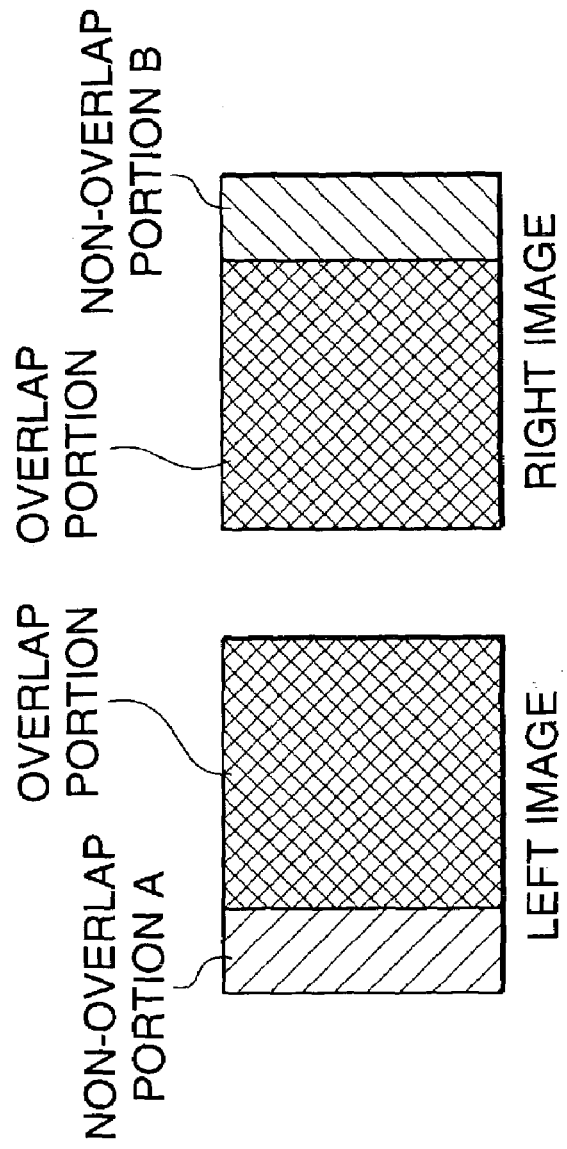
Figure 2:
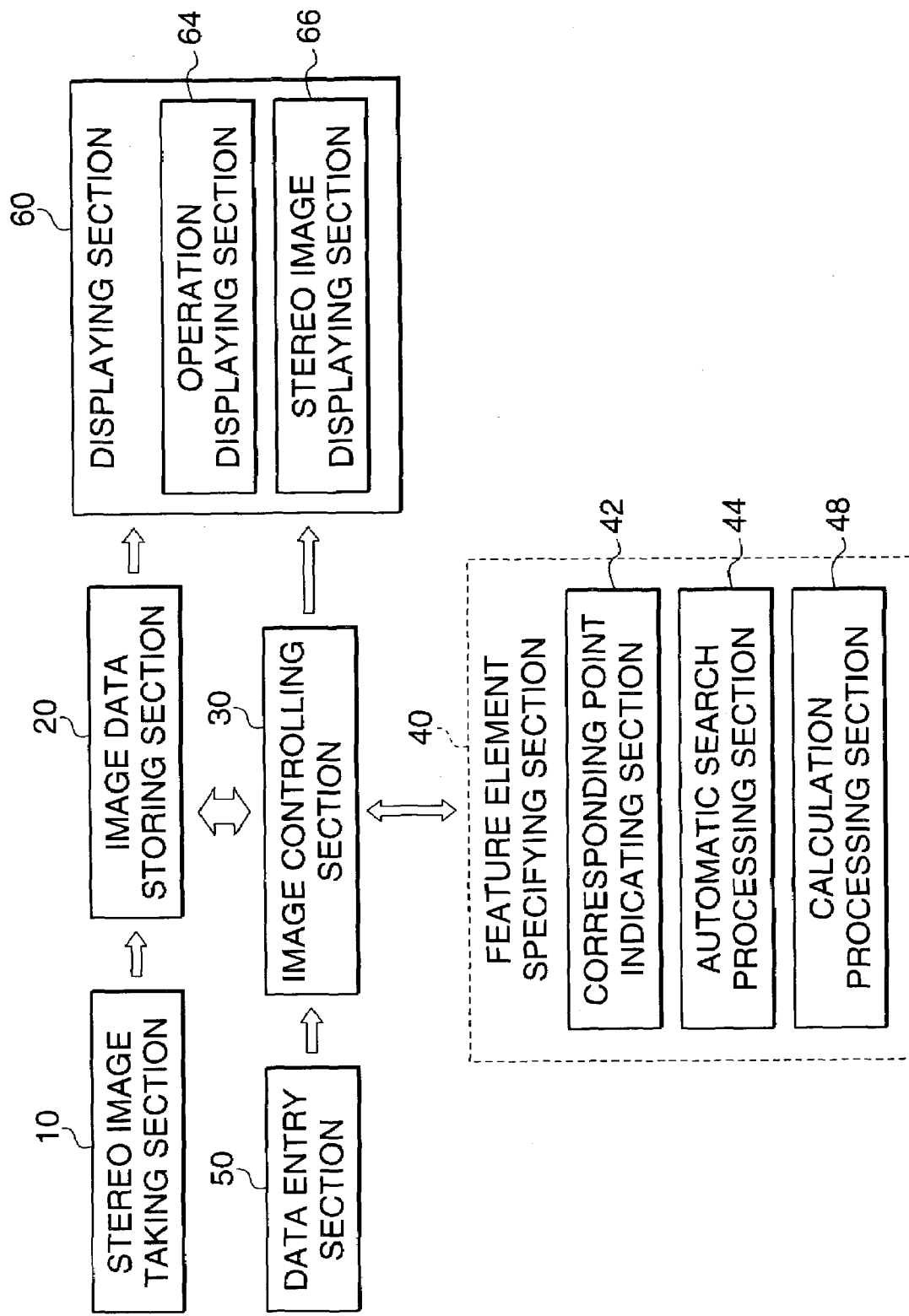
FIG. 2 is a block diagram of the entire constitution for explaining the first embodiment of the present invention.

The present invention will be hereinafter described in reference to the appended drawings. FIG. 2 is a block diagram of the entire constitution for explaining the first embodiment of the present invention. A stereo image displaying device is made up of: a stereo image taking section 10, an image data storing section 20, an image controlling section 30, a feature element specifying section 40, a data entering section 50, and a displaying section 60.

The stereo image taking section 10 may be of a precision type such as stereo cameras or a simpler type such as digital cameras and digital video cameras. The stereo camera is for stereo measurements with each camera fixed to be immovable relative to each other. Therefore, the base line length corresponding to the camera interval is constant. Since respective photographing distances of the cameras must be made accurately the same with each other, lenses of a fixed focal length are used. Since the photographing work area depends on the resolution of the camera, high precision lenses having less aberration are used to widen the photographing work area. Incidentally, the stereo image taking section 10 may use zoom lenses of variable focal length.

On the other hand, a stereo camera can also be constituted by attaching to a stereo bar two digital cameras or digital video cameras of the same optical characteristics. Or, a single digital camera or digital video camera may be used to take images from right and left photographing directions to a photographed object. In the case a single camera is used to take pictures from right and left photographing directions, care should be taken to keep unchanged the camera interval between the right and left photographing. Since the digital cameras or digital video cameras are greater in lens aberration than the stereo cameras, photographed data are preferably stored with lens aberration compensated in the image data storing section 20. Because of the greater lens aberration, the lens field is preferably made narrower than that of the stereo camera to secure accuracy.

The image data storing section 20 is for storing images taken with the stereo image taking section 10. In the case of digital cameras or digital video cameras, digital image information can be stored using flexible disks, CD-ROMs, hard disks, etc. To use analog stereo image information impressed on films of stereo cameras, the analog stereo image information is preferably stored after being digitized by scanning the analog information.

The image controlling section 30 calculates the position and tilt (exterior orientation elements) of the cameras using the image position specified with the feature element specifying section 40, and corrects displacement to create images (images with displacement corrected) that can be perceived in stereovision. The above work corresponds to the relative orientation and absolute orientation, out of the inner orientation, relative orientation, and absolute orientation, typically practiced in aerial photogrammetry. The image controlling section 30 may be arranged to be software on a personal computer or may be installed as PC software in the displaying section 60. The details of the principle of creating stereo images will be described later.

The image controlling section 30, when actual or virtual coordinate values or dimensions are entered through the data entering section 50 with respect to the feature points of the image specified with the feature element specifying section 40, converts the image into a stereo image that can be stereo-viewed in actual or virtual scale or dimension. When the stereo image to be stereo-viewed is created as described above and dimensions necessary for absolute orientation are given, stereo measurement becomes possible according to the principle of the stereo method.

The feature element specifying section 40 is to indicate feature points serving as feature elements on the right and left images when the stereo images are corrected to be suitable for stereo-viewing. The feature points of the image are those provided at least six in number in the overlapped area on the right and left images to enable orientation. The distribution intervals of the feature points on the right and left images may be determined to be roughly uniform. Preferably the feature points are easy for the operator or the automatic search processing section 44 to recognize in shape or pattern. For example, markers called targets may be provided on the photographed object.

The feature element specifying section 40 is provided with: a corresponding point indicating section 42 for indicating corresponding points of right and left images, an automatic search processing section 44 for automatically searching the corresponding points, and a calculation processing section 48 for carrying out calculation related to stereo-measurements, when stereo images are created or measured. The term 'corresponding points' as used herein refers to the feature points, of the feature points of the images, recognized to have the same features on the right and left images. The corresponding point indicating section 42 is to indicate directions such as planar or X-Y direction and depth direction, by means of a PC mouse or depth indicating dial. The corresponding point indicating section 42 is preferably provided with a function that changes the cursor mark indicated on the displaying section 60 when the cursor position of the displaying section 60 approaches a corresponding point.

The search for the corresponding points with the automatic search processing section 44 uses for example an image correlating process. That is, a point indicated as a feature point on the left image is used as a template to search on the right image. The image correlating process may use the correlation coefficient method or the SSDA method.

Since the corresponding points of the right and left images are determined with the corresponding point indicating section 42 and the automatic search processing section 44, corresponding points in stereo photographing can be obtained even when two cameras serving as the stereo image taking section 10 for taking stereo images are attached to the-stereo attachment or the like. Further, stereo models corresponding to stereo photographing can be created with the image controlling section 30 using the exterior orientation elements. In that case, stereo photographing and stereo model creation can be carried out in a stabilized manner irrespective of the degree of skill of the operator. With the stereo camera, since the base line length and the camera tilt are known, a stereo model can be created uniquely.

The data entering section 50 is used to enter reference amounts and the like to match actual dimensions. If creating stereo images is the only purpose, the data entering section 50 need not be provided. Stereo images can be created by giving dimensions through the data entering section 50 to the stereo images corrected for stereo-viewing and using dimensions entered as parameters necessary for the absolute orientation.

The displaying section 60 is to display images photographed or adapted for stereo-viewing, and is made up of an operation displaying section 64 and a stereo image displaying section 66. The operation displaying section 64 may be the monitor for a PC for use in the image controlling section 30. The stereo image displaying section 66 may be a stereo display of the dual display type for stereovision using polarizing glasses.

Figure 3:
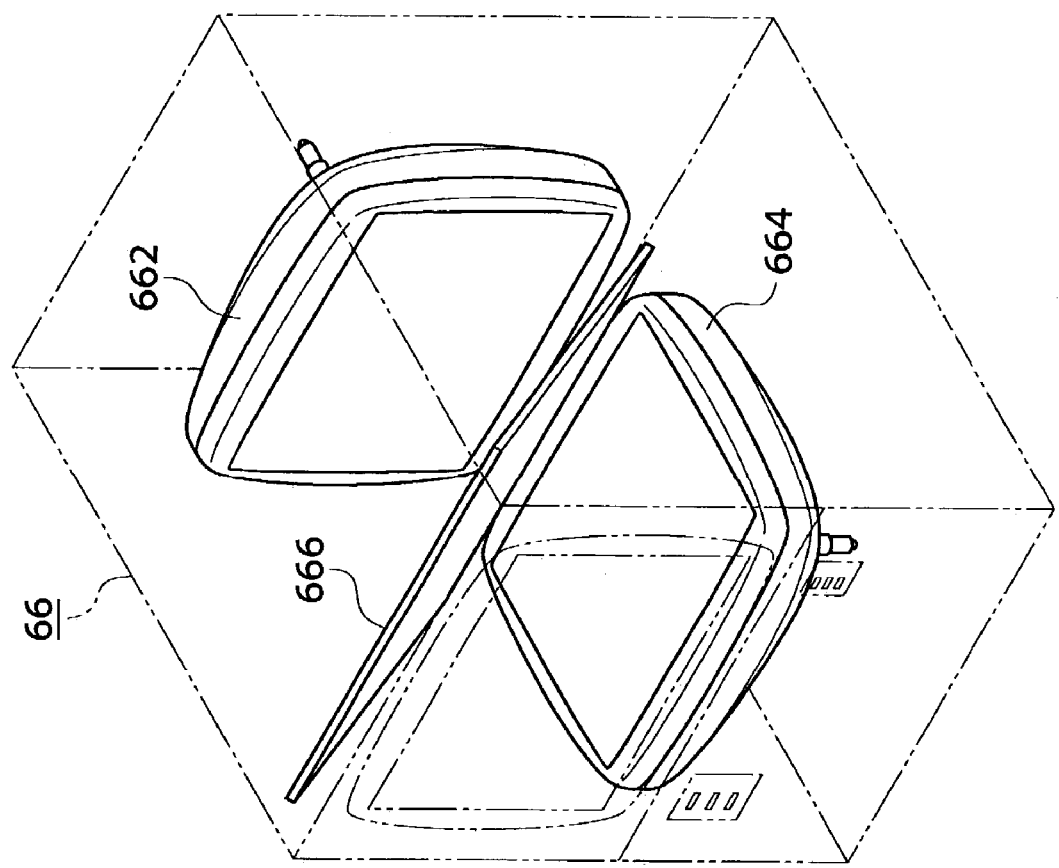
FIG. 3 is a constitutional perspective view for explaining a stereo display of a dual display type.
Figure 3:
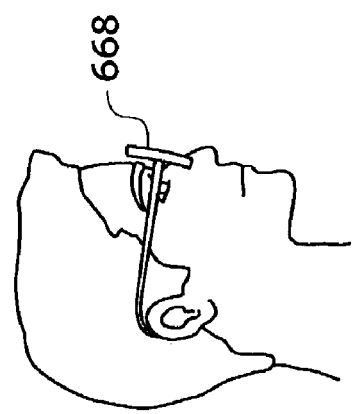

FIG. 3 is a constitutional perspective view for explaining a stereo display of the dual display type. With the dual display type, the right and left images are displayed respectively on polarizing displays 662, 664, and put together by the use of a partially reflecting mirror 666. The images put together with the partially reflecting mirror 666 are made to be in a polarized state so that right and left images can be separated using a pair of polarizing glasses 668. That is to say, the images displayed on the polarizing displays 662 and 664 are optically polarized in mutually orthogonal directions to be separable through a pair of polarizing glasses 668. When an observer sees the images displayed on the stereo image displaying section 66 using the polarizing glasses 668, the right and left images are simultaneously seen with right and left eyes respectively, so that the observer can perceive the object in three dimensions. The dual display type is more advantageous than conventional types such as the liquid crystal shutter type and the liquid crystal filter shutter type because the right and left images are observed simultaneously without being affected with external noise conditions such as fluorescent lights and lighting conditions. Thus, the observer can continue stereovision observation for an extended period of time in a stabilized manner.

On the displaying section 60 may displayed not only stereo images but also the indication of measurement points, instructions for operating the device, raw images taken, etc. These displays may be made to match the stereo image displaying section 66, or on the operation displaying section 64.

Figure 4:
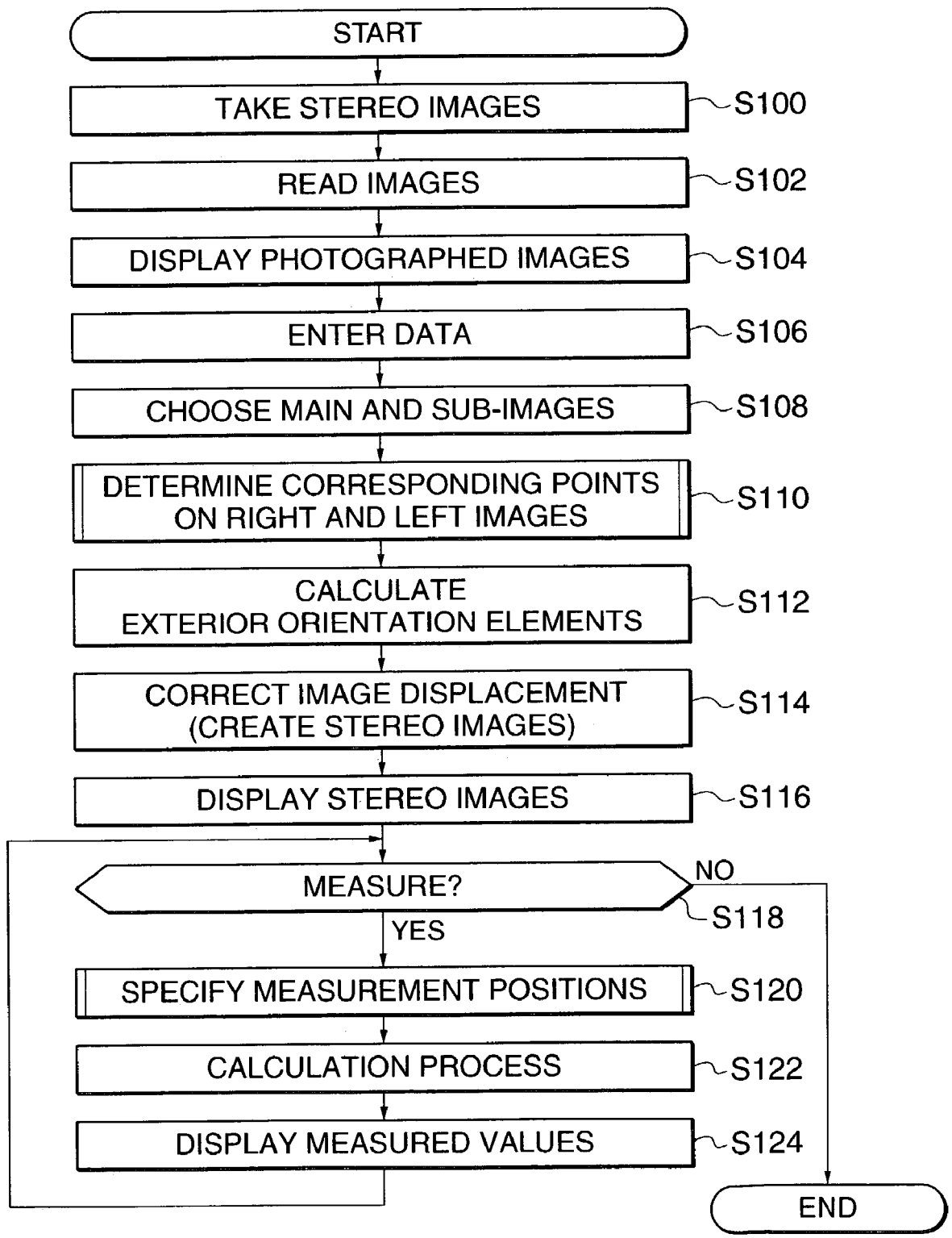
FIG. 4 is a flowchart for explaining the flow of stereo image measuring process with the device shown in FIG. 2.

Next is described how to use the device constituted as described above. FIG. 4 is a flowchart for explaining the flow of stereo image measuring process with the device shown in FIG. 2. First, pictures of an object for stereovision are taken using commercially available digital cameras or digital video cameras (S100). The pictures may be taken either with a single camera in two directions for the right and left images, or with two cameras fixed on right and left sides for stereovision.

Next, the right and left images taken for stereovision are read into the image data storing section 20 (S102). Then, the images read into the image data storing section 20 are displayed on the displaying section 60 (S104). Here, displaying two, right and left images side by side on the displaying section 60 facilitates operations thereafter. In the case the displaying section 60 is provided with the operation displaying section 64, it is better to display there. In this state too, stereovision is also possible by displaying on the displaying section 60 as long as the images are taken using a fixed stereo attachment parallel to the photographed object.

Next, in the case relevant dimensions of the feature points and coordinate values of the corresponding points are present on the right and left images taken for stereovision, such relevant dimensions are entered through the data entering section 50 (S106). For example, if known coordinate values of three points are present, such values may be entered through the data entering section 50. Then, conversion to a known coordinate system is possible in determining the corresponding points of the right and left images processed in S110 and three dimensional measurement can be carried out. The data entered through the data entering section 50 include tilt (direction) of the cameras used for taking pictures, known dimensions on the images, and the interval of the cameras (base line length) used for taking stereo pictures. Once those data necessary for relative orientation and absolute orientation are entered, it is possible to measure the created stereo images. Incidentally, it is also possible, in place of entering the data through the data entering section 50, to photograph in advance, using the stereo image taking section 10, some portions that can be used as reference dimensions into stereo images.

It is also possible to create stereo models of virtual dimensions instead of actual dimensions by entering virtual dimensions rather than actual dimensions through the data entering section 50. Or, stereo models can be created even if no data are entered through the data entering section 50 in the step S106, and to display images for stereovision on the stereo image displaying section 66. However, unless reference dimensions are otherwise determined, stereo images are obtained only in dimensions that are similar to the actual dimensions, and no absolute values are obtained.

Incidentally, the data entry through the data entering section 50 may be made as pre-entry of initial values instead of the position data entered in the step S106, or may be made at the time of determining the corresponding points of the right and left images processed in the step S110, or may be made after the process of determining the corresponding points of the right and left images.

Next, the main image and the sub-image are chosen (S108). Here, the main image is the one on which the reference cursor appears at the time of automatic correlation process. The sub-image is the one on which the sub-cursor appears at the time of automatic correlation process, and the sub-cursor automatically moves to a position of a high correlation value corresponding to the position of the reference cursor.

Which of the right and left images is to be made the main image is up to the operator. The main image is preferably chosen on the side of the operator's eye that is preferentially used when the operator recognizes shapes of objects. For, while humans create stereovision using both eyes, one of the eyes is preferentially used to recognize shapes of objects. To determine which eye is preferentially used, indicate any mark with a finger while seeing stereovision, and close one eye. If the indicated mark remains in the same position, the eye not closed is preferentially used. In the following description as an example, the main image is assumed to be the left image and the sub-image is the right image.

Next, corresponding points on the right and left images are indicated and determined with the corresponding point indicating section 42 of the feature element specifying section 40 (S110). Choosing at least six points on one of the right and left images and making them correspond to the same points on the other image, the position and tilt (exterior orientation elements) of cameras can be determined with the image controlling section 30 to which the principle of stereovision described before is to be applied. While any feature points may be determined on the right and left images, the work is made easy if distinct marks are provided by printing them along the periphery of the object. The distinct marks include for example black circle (●), square (■), diamond (◆), and triangle (▲). Incidentally, the work in a series of steps from determining the corresponding points to calculating exterior orientation element calculation is called controlling.

Figure 5A:
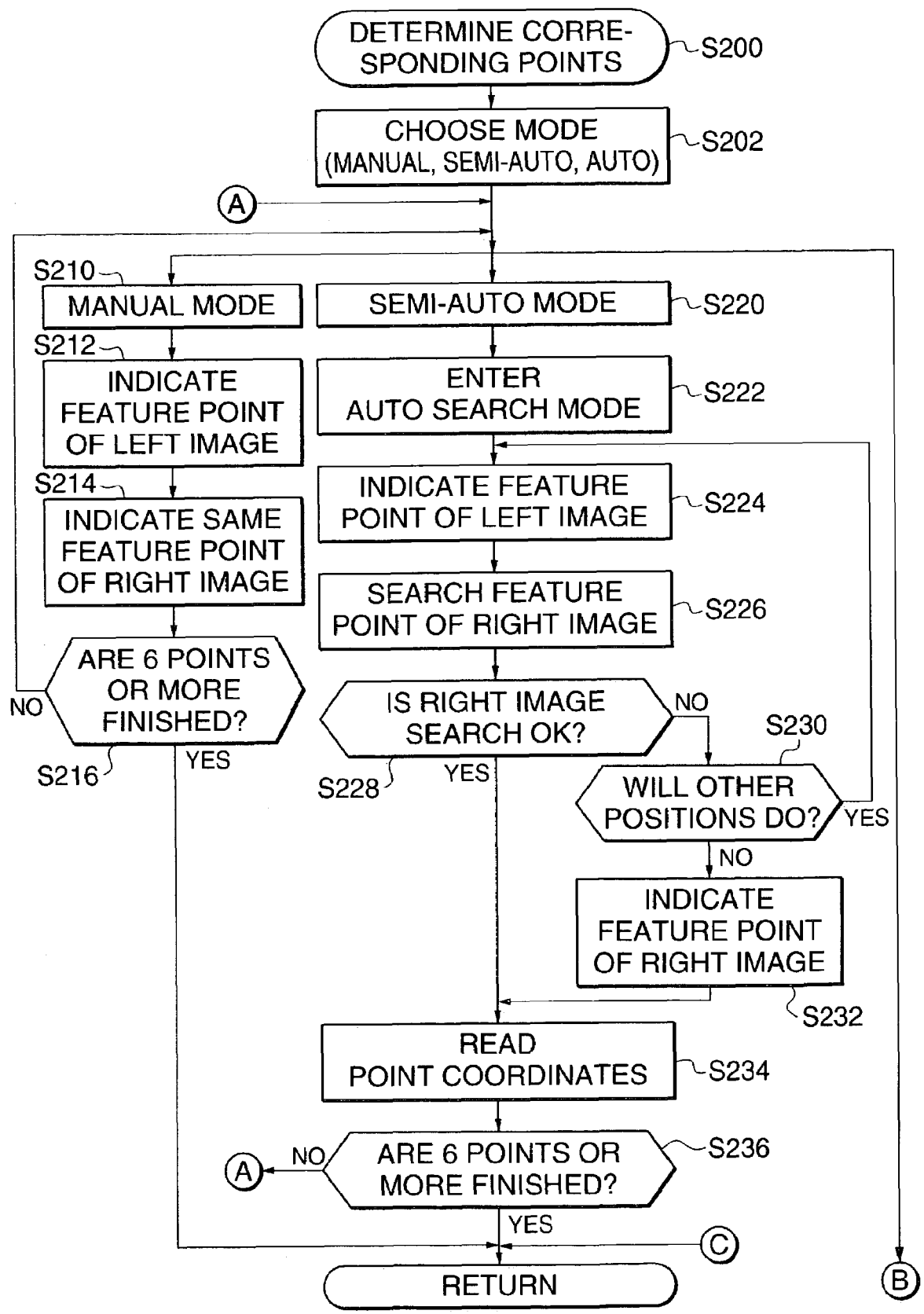
FIGS. 5A and 5B are flowcharts for explaining the process of determining corresponding points.
Figure 5B:
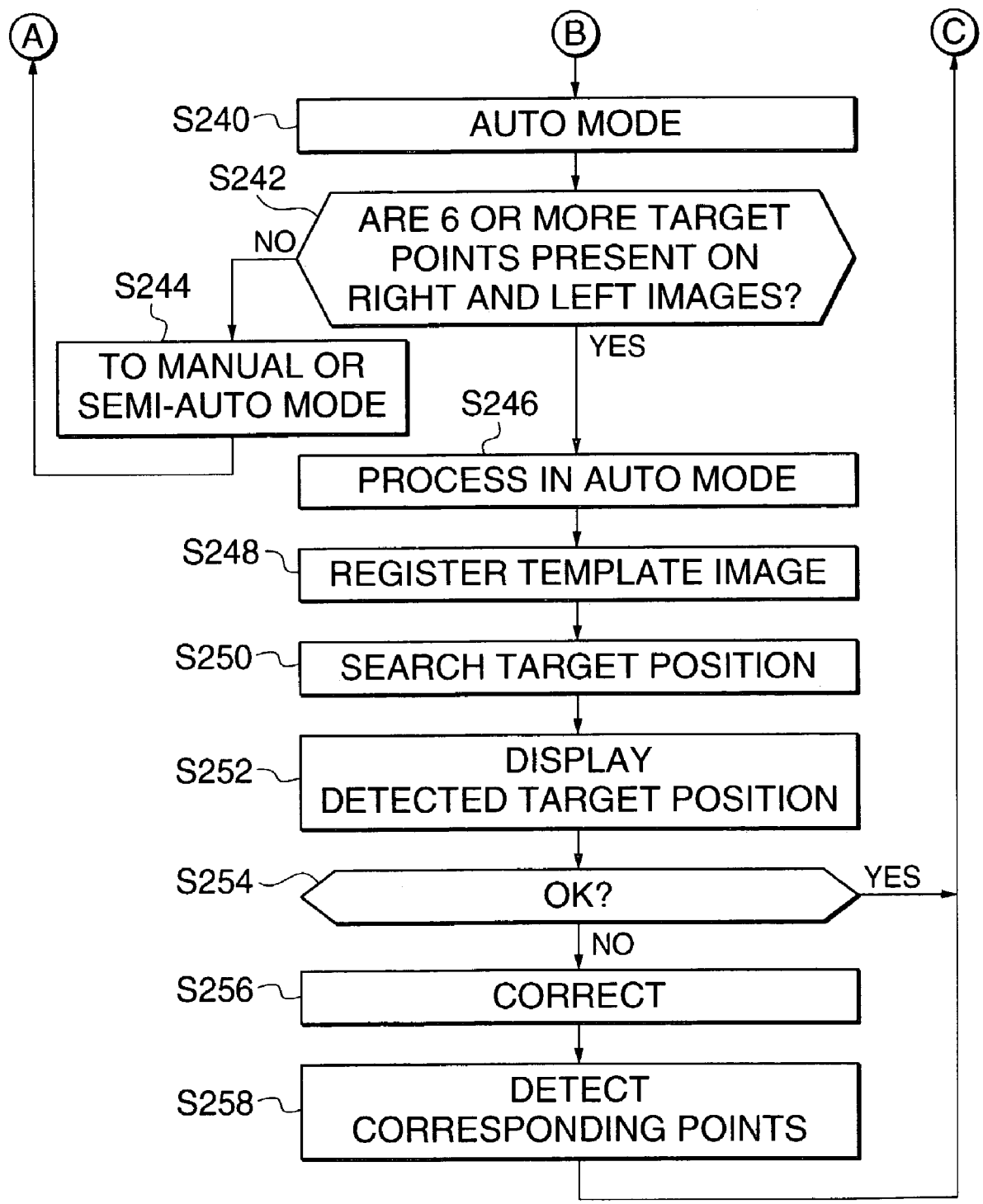

Next, a specific example of determining corresponding points on the right and left images will be described in reference to FIG. 5. FIG. 5 is a flowchart for that purpose. When the corresponding point determining process is started (S200), one of three modes is chosen: manual, semiautomatic, or automatic (S202). Incidentally, the following description of the process remains the same even if the terms right and left are interchanged, and so the process may be carried out by interpreting the terms right and left as interchanged.

When the manual mode is chosen, the process starts in the manual mode (S210). First, the operator uses the mouse of the corresponding point indicating section 42 to indicate a position to be a feature of the left image on the displaying section 60 and determines it (S212). The determination is made by for example clicking a mouse button. The left image coordinates are read by the determining process. Next, the same feature points as those on the left image of the displaying section 60 are indicated and determined with the mouse of the corresponding point indicating section 42 (S214). Thus, the right image coordinates are read. In the manual mode as described above, feature points are indicated and determined separately on the right and left images with the corresponding point indicating section 42. Whether six or more points are made to correspond is determined (S216) and if the number of points is less than six, the step goes back to S202 to choose the mode. Incidentally, a program may be arranged to return to the step S212 to continue the corresponding point determining process. If more than six points are made to correspond, the process is made to return.

When the semiautomatic mode is chosen, the process starts in the semiautomatic mode (S220). In the semiautomatic mode, the process moves on to automatic search mode with the automatic search processing section 44 of the feature element specifying section 40 (S222). As the operator using the mouse of the corresponding point indicating section 42 indicates a feature point of the left image on the displaying section 60 (S224), the automatic search processing section 44 automatically searches a corresponding point on the right image (S226).

The operator judges whether the corresponding point on the right image searched out with the automatic search processing section 44 is appropriate (S228). It is determined to be appropriate when a correlation coefficient calculated with the automatic search processing section 44 is greater than a predetermined threshold value such as 0.7. The corresponding point indicating section 42 causes the displaying section 60 to display at a point on the right image whether or not the point corresponding to the feature point on the left image is acceptable, if acceptable for example with a green dot, and if not with a red dot. The indication may be otherwise made by changing the shape of the cursor mark, for example by changing an arrow (⇒) to a double circle (◎), or by indicating the correlation coefficient value. Any indication may be used as long as it is easy for the operator to determine the appropriateness of the search on the right image.

If unacceptable, acceptability of any other corresponding point is judged (S230). If it is determined that the corresponding point may be in any other position, the process goes back to the step S224 to indicate another point. On the contrary, if the operator wants to use the position as the feature point by all means, the operator manually moves the cursor on the right image and indicates it (S232). That is, for example since the cursor on the right image moves in proportion to the amount of turning the dial or the like for controlling the depth of the corresponding point indicating section 42, the operator can control to bring the cursor to the same feature point as that on the left image to match.

In the case the result of search in S228 is acceptable or the point on the right image is indicated in S232, the coordinate values of the point on the image are read (S234). A final determination is made for example by pressing a mouse button. And whether or not six or more points are made to correspond is determined (S236). If not, the process goes back to S202 to choose a mode. Or, a program may be arranged to go back to S222 to continue the corresponding point searching process in the semiautomatic mode. If more than six points are made to correspond, the process is made to return.

In the semiautomatic mode described above, the corresponding point on the right image is automatically searched when a feature point on the left image is indicated with the mouse, and the acceptability is displayed. Then, the operator sees the displayed cursor mark, and if the corresponding point of the right image searched out with the automatic search processing section 44 is acceptable (for example when "⇒" is changed to "◎"), finalizes the corresponding point. Using the semiautomatic mode, since the operator has only to indicate the image on one side, the process of determining the corresponding point is simplified. Incidentally, while the indication and judgment for finalization using the mouse may be done by pressing the button, it may be further arranged that the determination of the corresponding point is constantly displayed simply by moving and tracing over the left image. Displaying the determination of the corresponding point of the right image corresponding to the mouse cursor on the left image further facilitates the process of determining the corresponding point.

When the automatic mode is chosen, the process starts in the automatic mode (S240). The semiautomatic mode is one in which targets are automatically detected by distributing in advance the targets to be the corresponding points around the object. Any things that can be easily recognized as feature points may be distributed in advance as targets around the object to be observed. The targets may be any things as long as they can be easily recognized. For example the target mark such as the "●" described above may be printed or created with a printer and distributed. Here, if the positions of the targets are accurately known in advance, three dimensional measurement thereafter can be made accurately.

First, the operator using the displaying section 60 confirms if targets in six or more points are included in the right and left images (S242). If not, the operator chooses the manual or semiautomatic mode (S242). In the case targets are not photographed in six or more points on the right and left images, photographing should be repeated to include six or more points. Then, the operator chooses the automatic mode using the feature element specifying section 40 (S246).

In the automatic mode process, in order to automatically detect targets, one of the distributed target images is indicated with the corresponding point indicating section 42 and registered as a template image in the feature element specifying section 40 (S248). Based on the template image, target positions on the right and left images are searched with the automatic search processing section 44 (S250). The process of searching the target positions is made automatically using for example the correlation coefficient method described before. The target positions searched out are displayed on the displaying section 60 (S252).

The operator judges if the searched target position is acceptable (S254) and if acceptable, clicks to return. If unacceptable, the operator corrects the target position (S256). This correcting process is made in the manual or semiautomatic mode. Even if unacceptable, the correction is easy because the targets are distributed in advance.

Figure 6A:
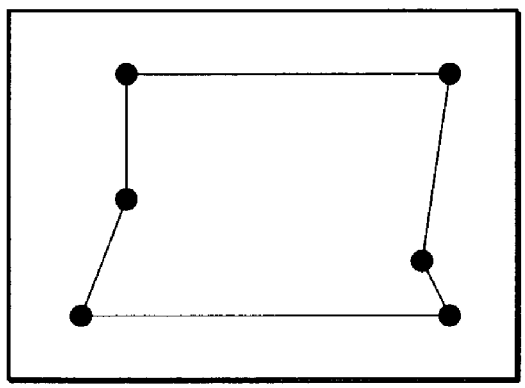
FIG. 6A shows an example of positioning of targets.
Figure 6A:
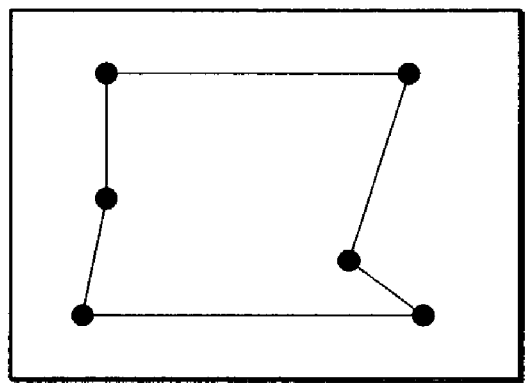

Using the corrected target position, corresponding points on the right and left images are detected (S258). This work is carried out using the corresponding point indicating section 42 of the feature element specifying section 40 by indicating the corresponding points on the right and left images while watching the displaying section 60. Or as shown in FIG. 6A, approximately parallel stereo images are photographed with target distribution predetermined. In this way, since the target distribution is also kept on the photographed images, position controlling can be done automatically. Furthermore, the position controlling can also be done automatically by separately determining six or more target marks and specifying a template in advance. Since the number of corresponding points on the right and left images is at least six, the work can be done easily even manually.

Referring again to FIG. 4, when controlling the corresponding points on the right and left images is over in S110, exterior orientation elements (position and tilt of the cameras) are calculated on the basis of the corresponding points with the image controlling section 30 (S112). Details of the exterior orientation elements are described later in the paragraph related to the principle of creating stereo images.

Once the exterior orientation elements are determined in S112, the images are corrected with the exterior orientation elements determined (creation of stereo images), (S114). And the stereo images are displayed on the displaying section 60 (S116). The stereo images are created as described above.

Figure 7A:
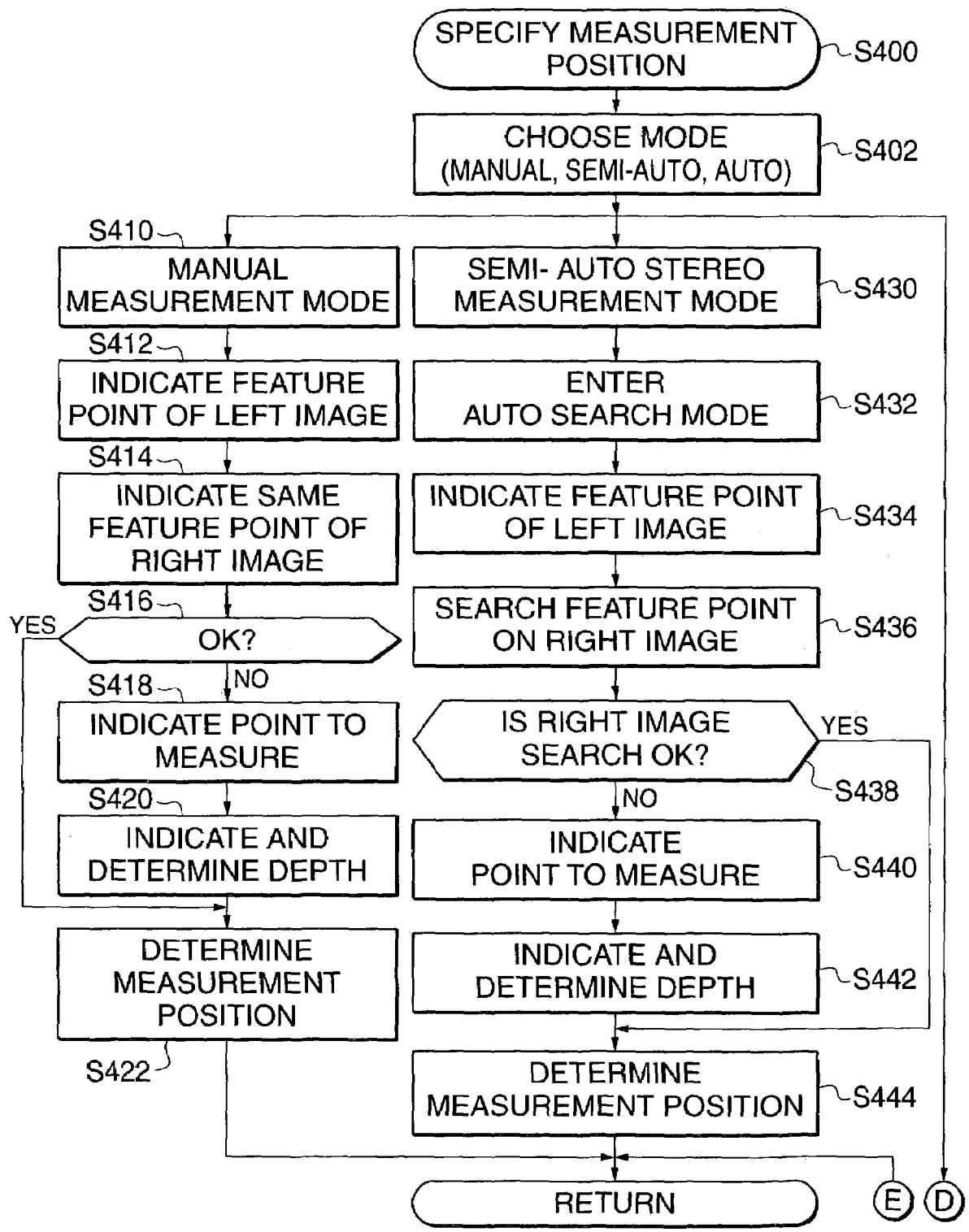
FIGS. 7A and 7B are flowcharts for explaining the measurement position specifying process according to the first embodiment.
Figure 7B:
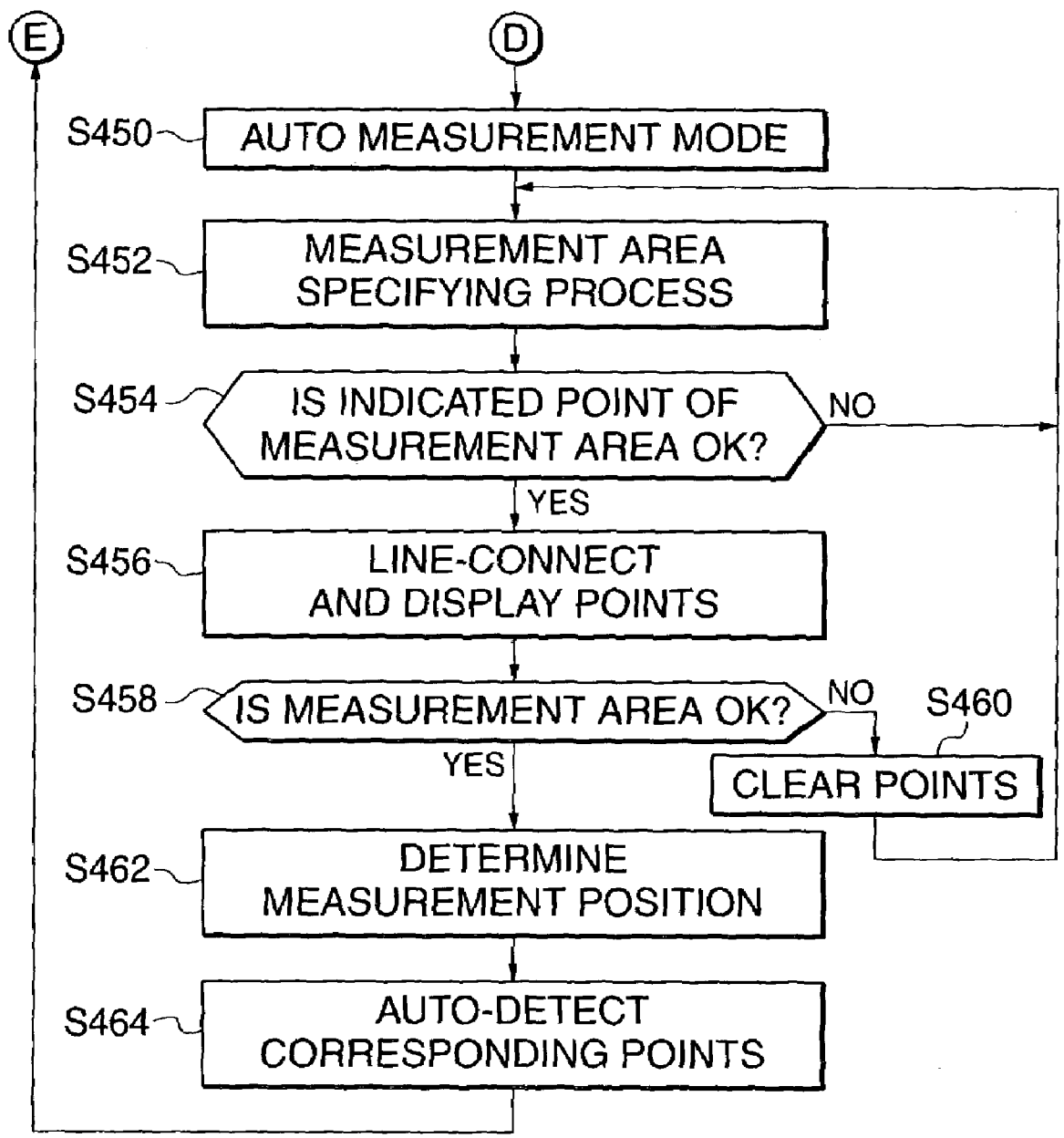

It is further determined if measurements are to be made from the displayed stereo images (S118). If yes, measurements are made (S120). Next, a specific process of specifying measurement points on the stereo image will be described in reference to FIG. 7, a flowchart of the measurement position specifying process. In the measurement position specifying process (S400), a mode of the measurement position specifying process is chosen from the manual, semiautomatic, and automatic modes (S402).

In each mode of the measurement position specifying process, three dimensional coordinates, the distance between two points, etc. of the specified points can be measured from the data entered through the data entering section. Here, since a stereo image is displayed on the stereo image displaying section 66, measurements can be made while watching it. Although it is possible to measure while watching separate, right and left images displayed on the operation displaying section 64, more accurate measurements can be made while confirming on the stereo image displaying section 66.

Indicating the depth direction on the stereo image of the corresponding point indicating section 42 is done by using the dial provided on the mouse or a single dial or the like.

When the manual mode is chosen, the process of specifying the measurement points starts in the manual mode (S410). Here will be described the process of the operator indicating the measurement points using the operation displaying section 64 while watching the stereo image displaying section 66. The operator, while watching the stereo image displaying section 66, indicates the position he wants to measure as the feature point on the left image displayed on the operation displaying section 64 (S412). Next, the operator indicates a point of the right image, displayed on the operation displaying section 64, that seems to be the same point as the feature point (S414). Then the operator, while watching the stereo image displaying section 66, confirms if the feature point of the left image and the feature point of the right image are on the matching feature point he wants to measure as indicated with the cursor (S416). The position of the point to be measured includes the depth direction as well as planar directions. If incorrect, the operator indicates another position he wants to measure using the mouse of the corresponding point indicating section 42 (S418).

When the operator is seeing the stereo image displaying section 66, he can also see in the depth direction. Therefore, the position controlling is also made in the depth direction (S420). That is to say, if the position in the depth direction is not in agreement, cursor seems to be sunk or afloat from the object point. If a dial for controlling in the depth direction is provided, the cursor position can be controlled onto the object point by using the dial. This work of controlling the cursor position is substantially the same as controlling the right and left image positions. However, since the work is done while watching the stereo image, it is free from error and reliable. If the feature point on the left image matches the feature point on the right image and is acceptable, the position is finalized with a mouse button or the like, and the coordinate position is read (S422).

When the semiautomatic measurement mode is chosen, the process of specifying the measurement position starts in the semiautomatic measurement mode (S430). In the semiautomatic measurement mode, the work may be carried out while watching either the operation displaying section 64 or the stereo image displaying section 66. In the semiautomatic measurement mode, the feature element specifying section 40 moves on to the automatic search processing section 44 (S432). And the operator indicates the measurement point on the left image with the mouse (S434). Then, a point on the right image that is the same as that on the left image is searched with the automatic search processing section 44 (S436). Incidentally, searching the point on the right image that is the same as that on the left image using the automatic search processing section 44 is quite the same as that described for S226. And the operator confirms whether the position searched and found on the right image is correct (S438).

If the position searched out on the right image does not match the measurement point on the left image, the operator using the mouse of the corresponding point indicating section 42 indicates another point he wants to measure (S440). At this time, since the operator can see in the depth direction as well as in the direction of the image plane on the stereo image displaying section 66, the position controlling is made also in the depth direction (S442). When the feature point on the right image matches that on the left image and acceptable, the position is finalized with the mouse button or the like, and causes the coordinate position to be read (S444). At this time, it is preferable to show, if the position is acceptable, an acceptance mark at the corresponding position on the right image on the operation displaying section 64. If it is shown on the stereo image displaying section 66, the acceptance mark can be confirmed by changing the color and shape of the cursor, and confirmed also visually by the operator.

Figure 6B:
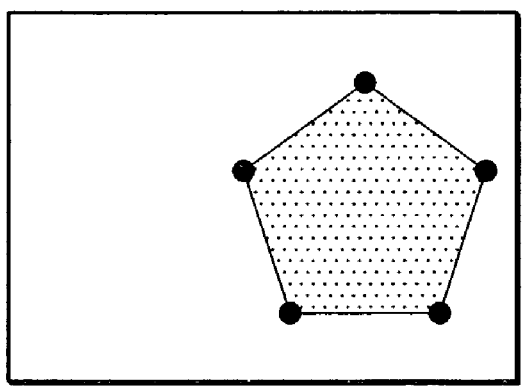
FIG. 6B is for explaining an example display of specifying corresponding boundaries and line connections.
Figure 6B:
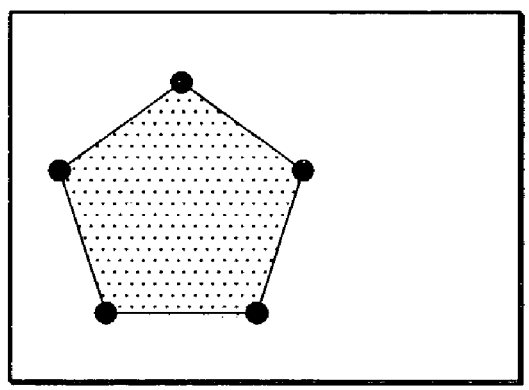

When the automatic measurement mode is chosen, the process of specifying the measurement position starts in the automatic measurement mode (S450). In the automatic measurement mode, three dimensional coordinate values in a specified area can be collectively measured. Therefore, a measurement area specifying process (S452) is carried out in which an area to be measured is specified. In other words, boundary points that are to be on the outermost sides of the measurement areas of the right and left images are specified. For example, in the case an area of a pentagon-like shape is to be collectively measured, five boundary points as shown in FIG. 6B are specified to be the corresponding boundaries. Here, the boundary points specified by the operator are indicated with black circles. The operator, referring to the display of the boundary points, judges whether the points indicating the boundaries on the right and left images are acceptable (S454), and if unacceptable or incorrect entry is made, goes back to S452 to specify again.

If the boundary points indicated on the right and left images are acceptable, those points are interconnected with lines to clarify the measurement area by displaying it on the stereo image displaying section 66 (S456). Then, as shown in FIG. 6B, the stereo image displaying section 66 shows corresponding boundaries in which the boundary points are interconnected with lines. The operator referring to the boundary points and connection lines displayed, judges whether or not the indicated measurement area is acceptable (S458). If unacceptable, the operator clears off the unacceptable connecting lines and points indicated (S460) and goes back to S452 to specify again. If the specified measurement area is acceptable, the operator finalizes it (S462). Once the measurement area is determined as described above, since the corresponding points on the right and left images in that area are determined correctly, collective measurement can be made reliably. Reliability and speed of the collective measurement can be also enhanced by utilizing the corresponding points on the right and left images.

Next, corresponding points in the specified measurement area are collectively and automatically detected with the automatic search processing section 44 (S464). This is done through image correlation process. For example, using the correlation coefficient method described before, corresponding points of respective points are detected with the left image as a template and with the right image as its search area. Incidentally, the image correlation process may be any ordinary processing method such as the density search correlation method and the like utilized for image correlation process.

Referring again to FIG. 4, measurement values are calculated from the right and left coordinate values of the corresponding points using the calculation processing section 48 (S122). The calculation is done according to the stereo method principle described before. In the case the corresponding points of the measurement area are automatically detected in the automatic mode, the calculation is done for all the detected points, and the results are displayed on the displaying section 60 (S124). Then, the process goes back to S118 to determine whether the measurement is to be continued (S118). To continue, the measurements are repeated. Not to continue, the process is brought to an end.

In the case the area measurement is done automatically, it is possible to display the values not with numerals but with bird's eye views or contour maps. It is also possible to transfer those area measurement data to other CAD (computer-aided design) devices for processing there.

Next, the second embodiment of the present invention will be described. According to the second embodiment, device and method of displaying stereo images are put to practical use that are free from fatigue even in an extended period of time of watching stereo images constituted with paired right and left images.

Figure 8:
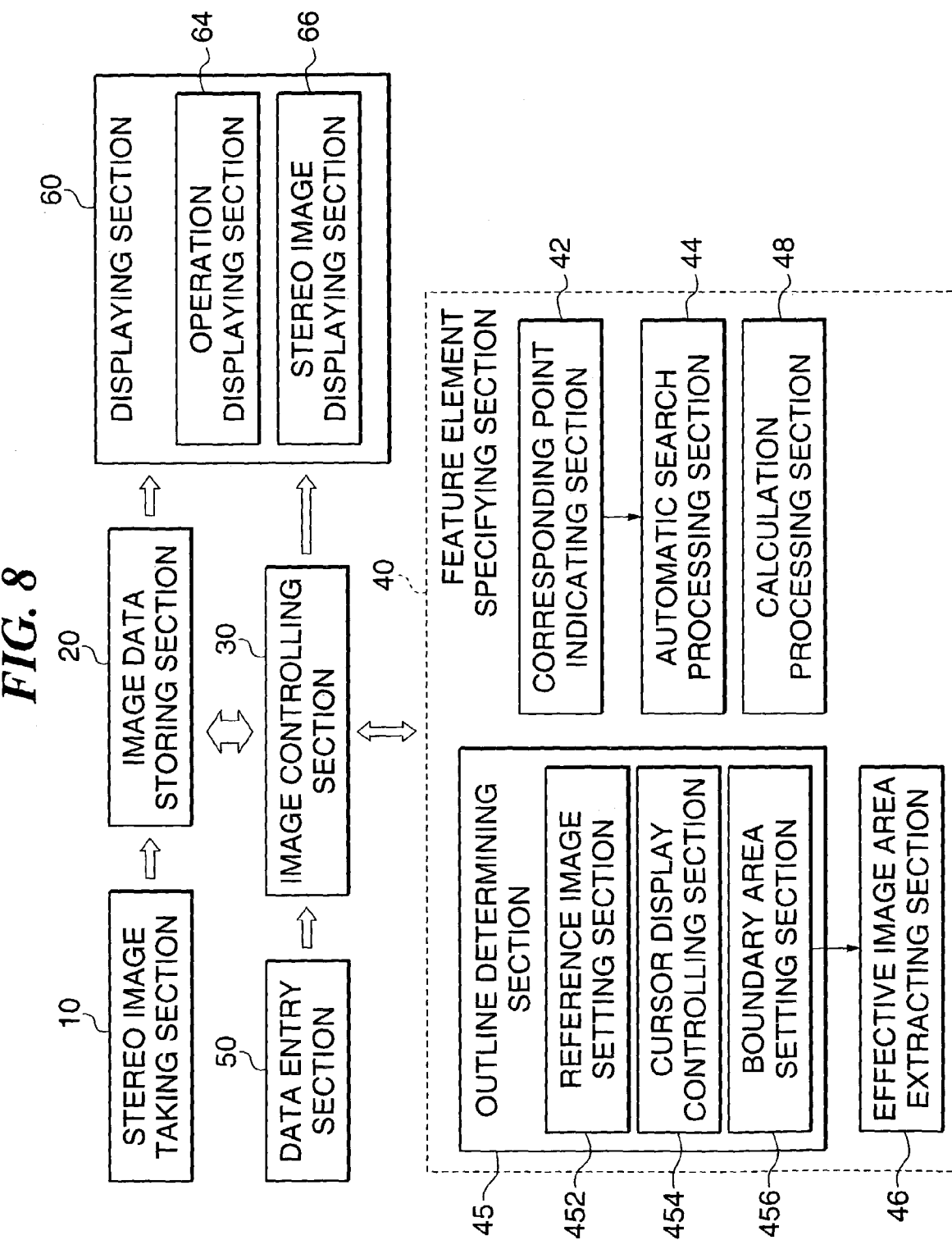
FIG. 8 is a block diagram of the entire constitution for explaining the second embodiment of the present invention.

FIG. 8 is a block diagram of the entire constitution for explaining the second embodiment of the present invention. Incidentally in FIG. 8, the same components as those in FIG. 2 are provided with the same reference numerals and their explanation is not repeated. With the stereo image taking section 10, also in the case stereo images are photographed with two cameras attached to the stereo attachment or the like, stereo models can be created by determining corresponding points used in the stereo photographing. Then, creation of stereo models and stereo photographing are possible in a stabilized manner irrespective of the degree of skill of the operator. Since the base line length and the tilt of the stereo cameras are known, stereo models are uniquely obtained by the use of relevant parameters.

The feature element specifying section 40 has, in addition to the corresponding point indicating section 42 and the automatic search processing section 44, the outline determining section 45 for determining the overlap portion related to stereo display and measurement, the effective image area extracting section 46 for extracting the overlap portion, and the calculation processing section 48 for carrying out calculation in the stereo measurement.

The outline determining section 45 is made up of the reference image setting section 452, the cursor display controlling section 454, and the boundary area setting section 456. The reference image setting section 452 sets one of the paired stereo images to be a reference image and the other to be a sub-image. Here, the reference image setting section 452 is arranged to handle the image on the side of the preferentially used eye of the operator as the main image, so that either image on the side matching the individuality of the operator can be chosen as the main image to alleviate burden of stereo-viewing work on the operator. The cursor display controlling section 454 is constituted to display a reference cursor on the reference image side and a sub-cursor on the sub-image side. In order to facilitate movement operation by the operator, it is preferably arranged to motion-display the sub-cursor in the position on the sub-image corresponding to the reference cursor motion-displayed on the main image. The boundary area setting section 456, when a boundary area is set on the reference image side as specified with the reference cursor, sets a corresponding boundary area on the sub-image side according to the boundary area on the reference image. The boundary area setting includes: the function of creating a corresponding boundary points on the sub-image side when boundary points are set on the main image side by the operator, the function of creating the outline of the boundary area on the main image side by interpolating the specified boundary points, and the function of creating the outline of the boundary area on the sub-image side by interpolating the corresponding boundary points created.

Figure 9:
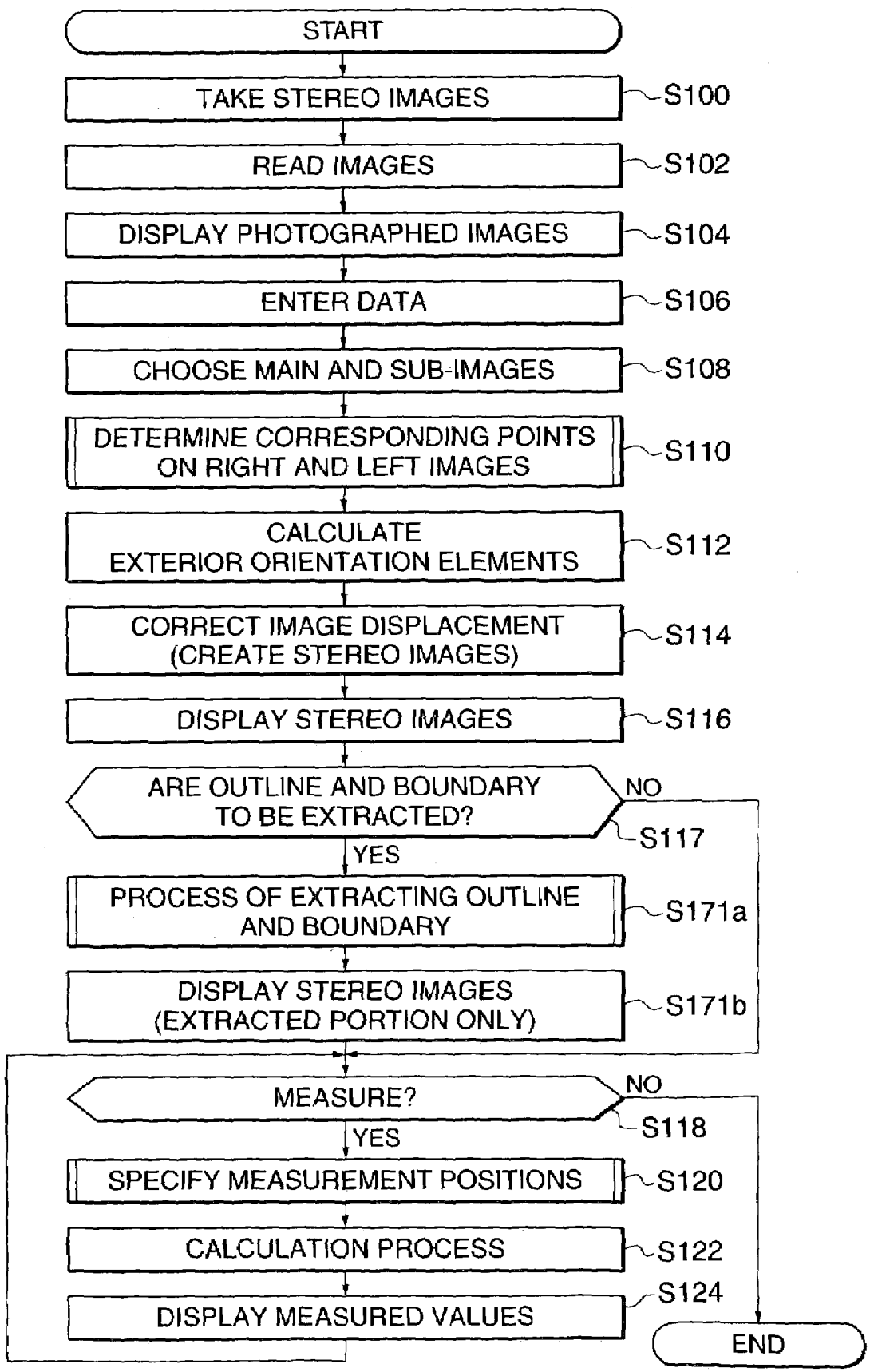
FIG. 9 is a flowchart for explaining the flow of the stereo image measuring process with the device shown in FIG. 8.

FIG. 9 is a flowchart for explaining the second embodiment of the invention shown in FIG. 8. Incidentally in FIG. 9, the steps having the same function as those in FIG. 4 are provided with the same reference numerals and their explanation is not repeated. The same explanation as that made in reference to FIG. 4 applies to S100 to S116. However, in S108, the main image and sub-image are chosen, and the reference image setting section 452 handles one of the right and left images chosen as the main image.

After S116, the process waits for a judgment by the operator whether the outline of the overlap portion or a corresponding boundary is to be extracted to facilitate the stereo-viewing (S117). In the case the outline or corresponding boundary is to be extracted, the outline of the overlap portion or the boundary of the area the operator wants to see in stereovision is to be extracted within the overlap portion (S117a). In the case the outline or the corresponding boundary is not to be extracted, the operator skips the process of extracting the outline or the corresponding boundary and moves on to S118.

Figure 10A:
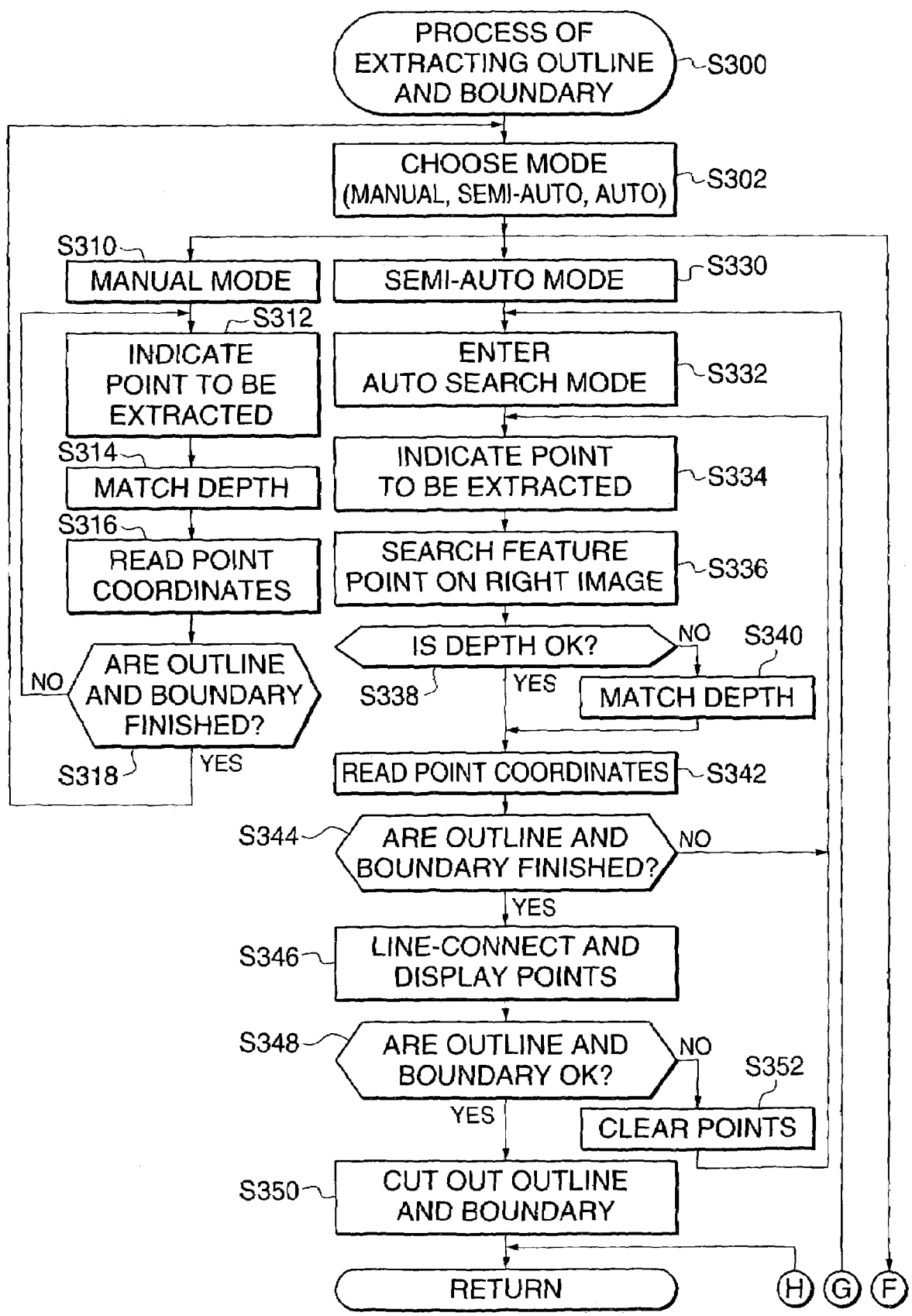
FIGS. 10A and 10B are flowcharts for explaining the process of extracting the outline or corresponding boundary.
Figure 10B:
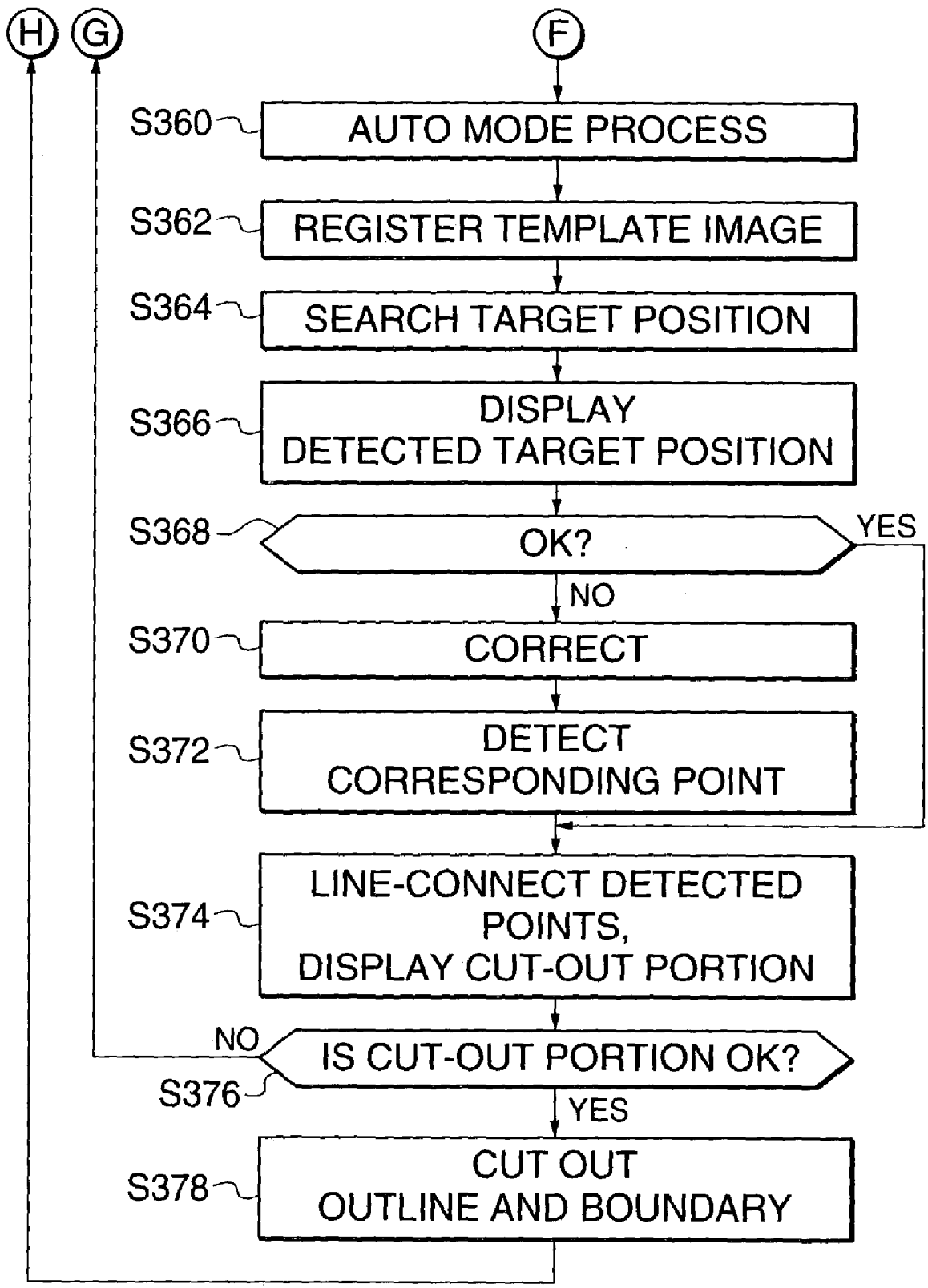

Next, a specific process of extracting the outline or the corresponding boundary of the overlap portion will be described in reference to FIG. 10, a flowchart for explaining the process. Incidentally, in the case the operator wants to extract the outline of the overlap portion or in the case the operator determines the corresponding boundary and cut it out, the process is the same as that described below.

The operation by the operator using the outline determining section 45 can be done in two ways: using the operation displaying section 64 on which the right and left images are displayed simultaneously, or watching the stereo image displaying section 66. In the case of operation while watching the stereo image displaying section 66, the operator can draw the outline or the boundary line in any shape he wants. For example, if the operator wants to cut out a stereo image with straight lines, he performs the operation on the stereo image. Then, the operator uses the cursor display controlling section 454 to match the cursors displayed on the right and left images each other. And in the process with the boundary area setting section 456, the cut-out can be made while watching the depth. Here, because of the presence of height difference, a straight line on the left image is not straight on the right image. However, since the work can be carried out in consideration of the straight line in three dimensions by stereo synthesis with the stereo image displaying section 66, work with the effective image area extracting section 46 can be carried out easily.

In the process of extracting outline or corresponding boundary (S300), the manual, semi-automatic, or automatic mode is chosen (S302). When the manual mode is chosen, the process starts in the manual mode (S310). First, the operator uses the mouse of the corresponding point specifying section 42 to move the cursor and indicate the outline and corresponding boundary points the operator wants to extract while watching the stereo image displaying section 66 (S312). With the cursor display controlling section 454, the cursors displayed on the right and left images come to agreement.

Next, the outline and corresponding boundary the operator wants to extract are made to match in depth (S314). The cursor on the stereo image displaying section 66 looks like moving back and forth in the depth direction when the dial of the corresponding point specifying section 42 is turned. Therefore, the operator can adjust the cursor position in the depth direction so that the cursor is present on the surface of the actual object. After controlling in the depth direction, the position is finalized for example by pressing the mouse button, and causes the right and left images to be read (S316). Incidentally, adjusting in the depth direction is the same as for example searching a position on the right image that corresponds to the mouse used as a reference position indicated on the left image. When the cursor position adjustment is displayed on the stereo image displaying section 66, the change in the depth direction is observed. Incidentally, when the right and left coordinates differ greatly in the depth direction, two cursors are observed on the right and left, so that the cursor looks like having moved to a different position. Next, whether the outline and corresponding boundary to be extracted are finished is determined (S318). If not finished yet, the process goes back to S302 to choose a mode to be used for processing the next feature point.

When the semi-automatic mode is chosen, the process starts in the semi-automatic mode (S330). Here, an example case will be described in which the operation is carried out while watching the stereo image displaying section 66. The feature point in the semi-automatic mode is the outline of the overlap portion or corresponding boundary the operator wants to cut out. Therefore, the outline determining section 45 starts searching the corresponding point using the automatic search processing section 44 in the automatic searching mode (S332). In the corresponding point searching process, the operator using the mouse of the corresponding point specifying section 42 indicates an outline or a cut-out boundary as the feature point to be extracted on the left image of the stereo image displaying section 66 (S334). Then, the automatic search processing section 44 automatically searches a corresponding point on the right image (S336).

Then, the operator judges whether the corresponding point on the right image searched out with the automatic search processing section 44 is appropriate, in particular with respect to depth (S338). If the depth is not appropriate, the operator adjusts the cursor position in the depth direction so that the cursor comes to a position on the surface of the actual object (S340). When the position in the depth direction is corrected, the operator finalizes the position for example by pressing the mouse button and causes the coordinates of the right and left images to be read (S342). Then, the boundary area setting section 456 handles the coordinates of the right and left images read as those of the boundary point and the corresponding boundary. Next, the operator judges whether the outline and corresponding boundary the operator wants to extract are finished (S344). If not finished yet, the process moves back to S334 to process with a next feature point.

When the process is complete in S344, corresponding points on the right and left images are interconnected with lines using the functions of interpolating and line-connecting the boundary points and corresponding boundaries of the boundary area setting section 456 and displayed (S346). For example, FIG. 6B shows the corresponding boundaries that are specified, line-connected, and displayed. And the operator, while observing the stereo image displaying section 66, judges whether the outline and corresponding boundary on the right image searched out with the automatic search processing section 44 are acceptable (S348). If acceptable, the effective image area extracting section 46, on the basis of the outline and corresponding boundary, cuts them out from the image and makes them the overlap display area (S350). If unacceptable, the operator clears the corresponding points on the right and left images (S352), and goes back to S334 to repeat the point indicating process in the semi-automatic mode. In the point indicating process in the semi-automatic mode, the corresponding points may be placed at shorter intervals. Moreover, the line-connection may be done every time the corresponding points are indicated and finalized between S342 and S344 rather than at the time of S346. When the overlap display area is determined, the process is returned to S117*b* to display the stereo image of the cut-out area.

When the automatic mode is chosen, the process starts in the automatic mode (S360). In the automatic mode, distinct marks printed or created are used, like the targets used for the automatic process of determining the corresponding points. Therefore, the area inside the allocated marks is to be cut out with the effective image area extracting section 46. Alternatively, for example as shown in FIG. 6B, in the case an area surrounded with the targets used for automatically determining the corresponding points can be used as the overlap displaying area, the target positions may be used as they are. In the case the overlap displaying area is to be another area different from the target area used for automatically determining the corresponding points, marks other than the targets are allocated and photographed into the stereo images. In that case, marks to be allocated may be in any number, and the overlap area to be cut out is one surrounded with the outermost lines interconnecting the marks.

In the automatic mode process, the outline determining section 45 registers the image of the target mark as a template and searches on the right and left images. In other words, to detect targets automatically, one of the allocated target images is indicated with the corresponding point specifying section 42 and registered as a template image in the feature element specifying section 40 (S362). On the basis of the template image, the right and left images are searched for the target positions (S364). This process of target position search is automatically carried out by utilizing the correlation coefficient method or the like mentioned before. The target positions searched out are displayed on the displaying section 60 (S366).

Whether the target positions searched out are acceptable is determined (S368). If acceptable, the process moves on to S374. If unacceptable, the boundary area setting section 456 is used to correct the target positions (S370). This correction is processed in the manual or semi-automatic mode. Even if unacceptable, correction is easy because the targets are allocated. Corresponding points on the right and left images are detected using the corrected target positions (S372).

Next, the points detected as the corresponding points are interconnected with lines using the boundary area setting section 456 and displayed on the displaying section 60 (S374). The operator judges whether the portion cut out with the effective image area extracting section 46 is acceptable (S376), and if unacceptable, goes to S332 to specify again with the outline extracting process in the semi-automatic mode. If the portion cut out with the effective image area extracting section 46 is acceptable, the effective image area extracting section 46 cuts out that portion along the outline or the boundary and makes it an overlap display area (S378). When the overlap display area is determined, the process is returned to S117b to display the stereo image of the cut-out area.

Figure 11A:
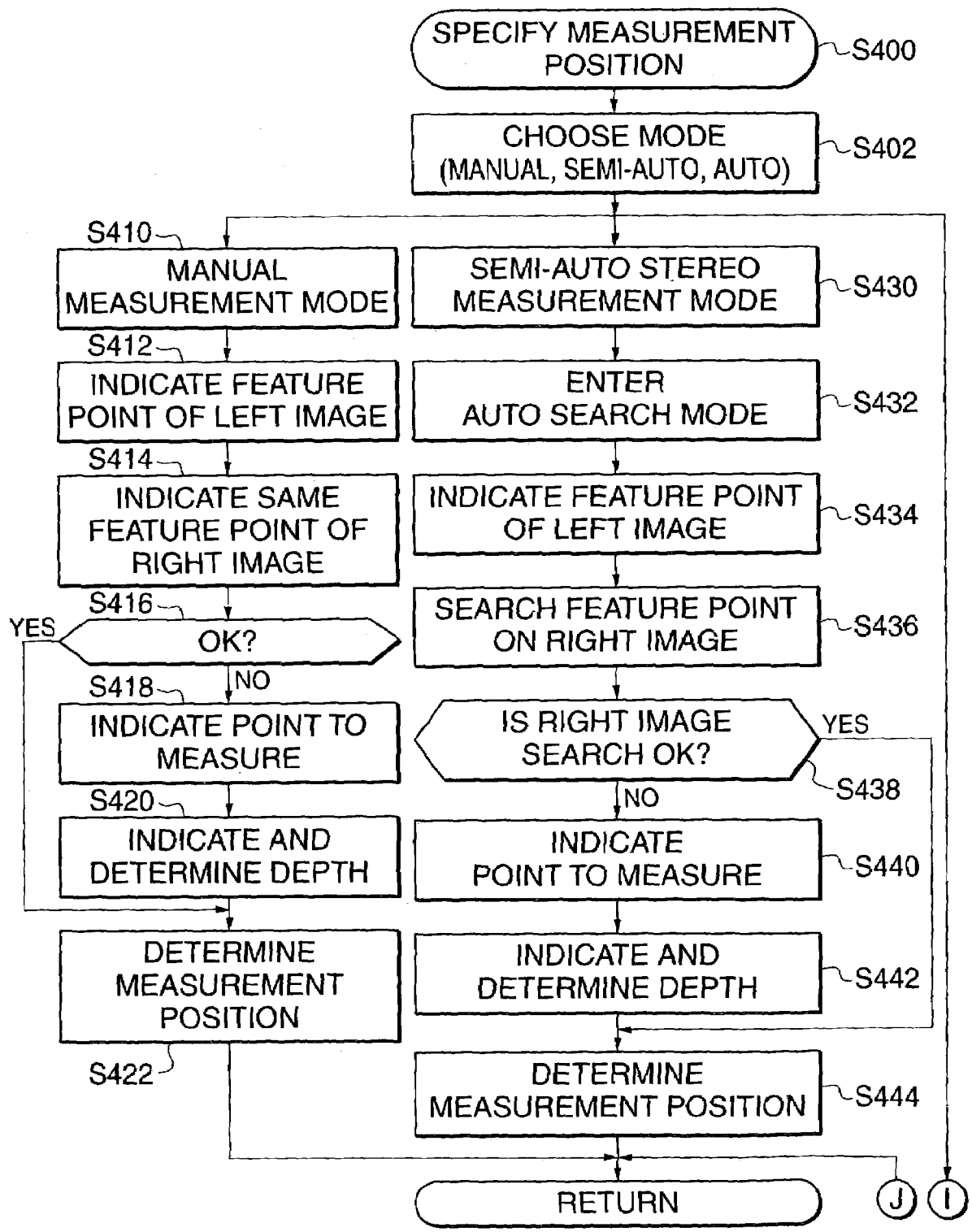
FIGS. 11A and 11B are flowcharts for explaining the measurement position specifying process with the second embodiment.
Figure 11B:
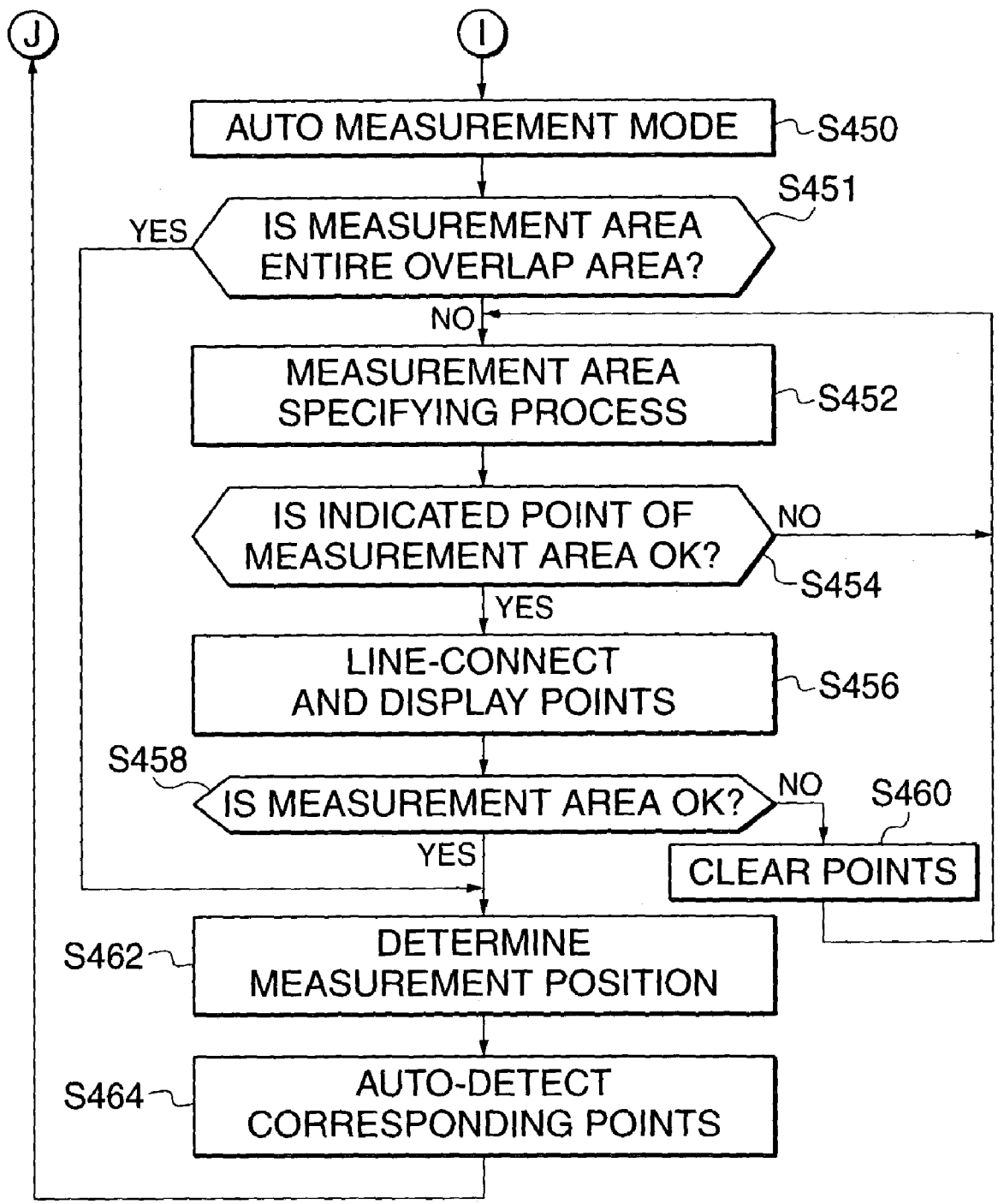

Referring back to FIG. 9, the outlines or the boundaries area extracted with the effective image area extracting section 46 are displayed on the displaying section 60 as overlapped stereo images (S117b). In this way, the overlap display areas are displayed to be easily perceived in stereovision. Therefore, the following measurement work can also be done easily by carrying it out in the overlap display area. Details in S118 to S120 are the same as those explained in reference to FIG. 4. However, specific process steps of specifying the measurement positions of the stereo images carried out in S120 are explained in reference to FIG. 11, a flowchart for that explanation. While it can be seen that most part of the steps of the flowchart of FIG. 11 is the same as that of FIG. 7, S451 is specifically added in FIG. 11. That is to say, three dimensional coordinate values of the specified area can be collectively measured in the automatic measurement mode of the S450. Therefore, it is first determined whether the measurement area is the whole of the overlap area (S451). If it is the whole, the process jumps to S462. On the contrary, if it is part of the overlap area, the measurement area specifying process is carried out for the area the operator wants to measure (S452).

Returning to FIG. 9, the explanation for S122 to S124 is the same as that made in reference to FIG. 4.

Next, the basic principle of the stereo image measurement carried out in the above embodiments will be described for each item.

1. Principle of Stereo Method

Figure 12:
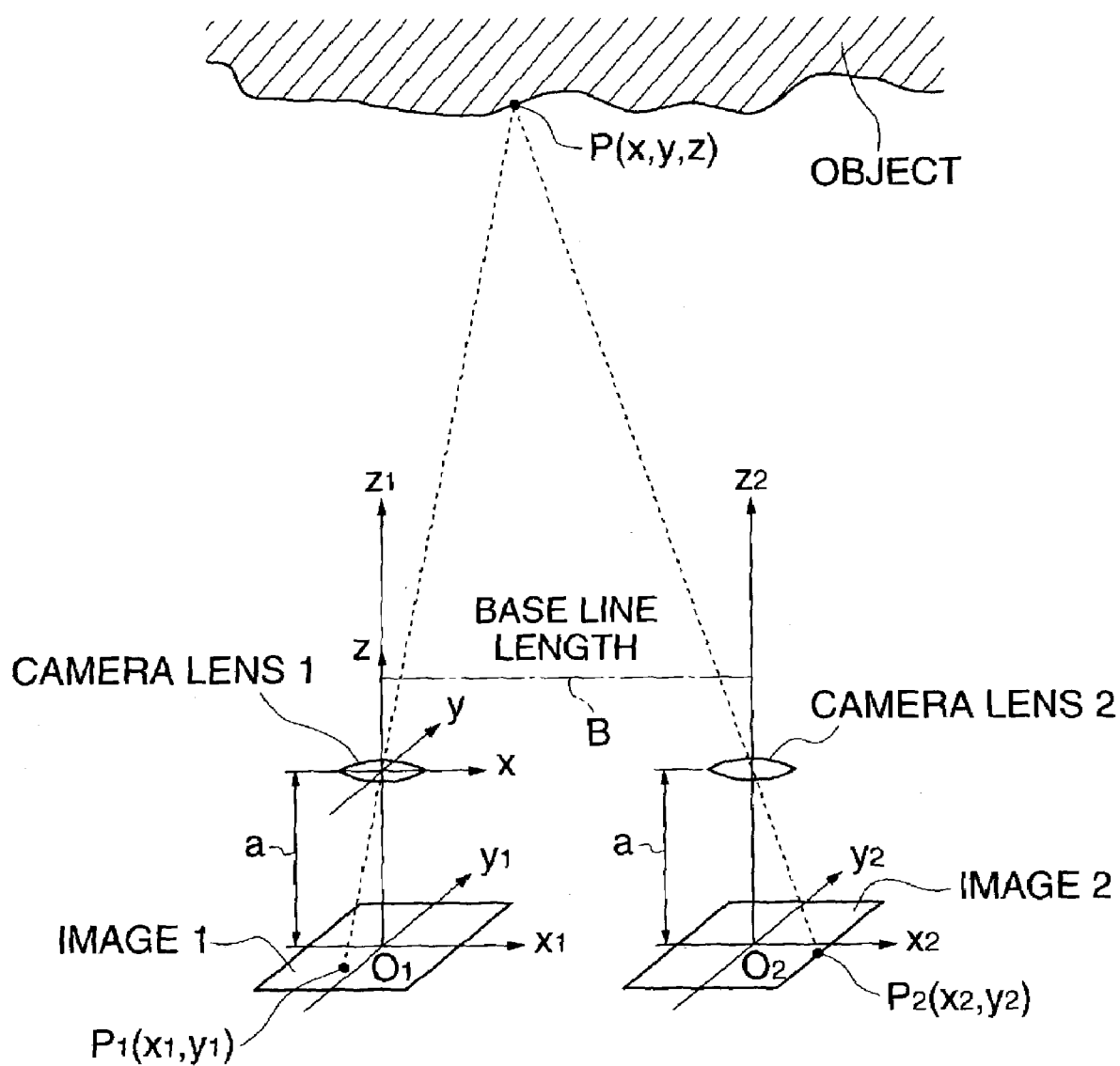
FIG. 12 is a drawing for explaining the principle of the stereo method.

The principle of the stereo method is described below. FIG. 12 is a drawing for explaining the principle of the stereo method. As shown in FIG. 12, two cameras 1 and 2 are placed with their optical axes parallel to each other, with the lenses at an equal distance (a) from the photographing plane, or the CCD plane placed at right angles to the optical axes. The distance between the two optical axes (base line length), equal to the distance between the cameras 1 and 2, is assumed to be 1.

Here, the coordinates of the points P1(x1, y1) and P2(x2, y2) on the object to be photographed are in the following relationship:

$$x1 = ax/z \quad (1)$$

$$y1 = y2 = ay/z \quad (2)$$

$$x2 - x1 = a1/z \quad (3)$$

where the origin of the entire coordinate system (x, y, z) is assumed to be at the center of the lens of the camera 1. Obtaining z from the equation (3) and using it with the equations (1) and (2), x and y are obtained. Obtaining corresponding points of the right and left images as described above, three dimensional coordinates of the positions can be measured.

2. Principle of Creating Stereo Images

Figure 13:
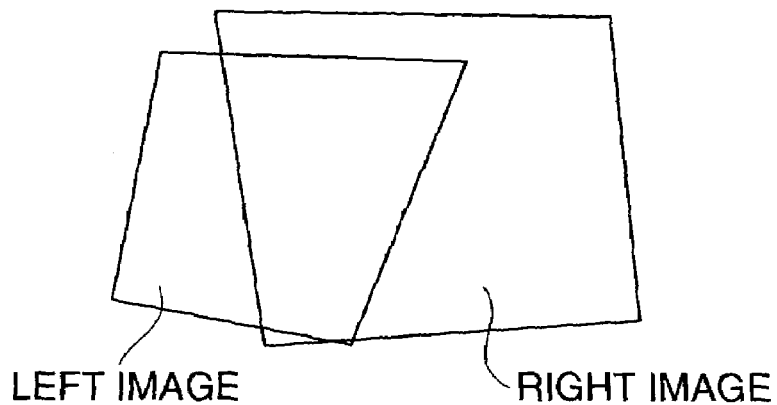
FIG. 13 shows the example figures that cannot be perceived in stereovision by human eyes.
Figure 14:
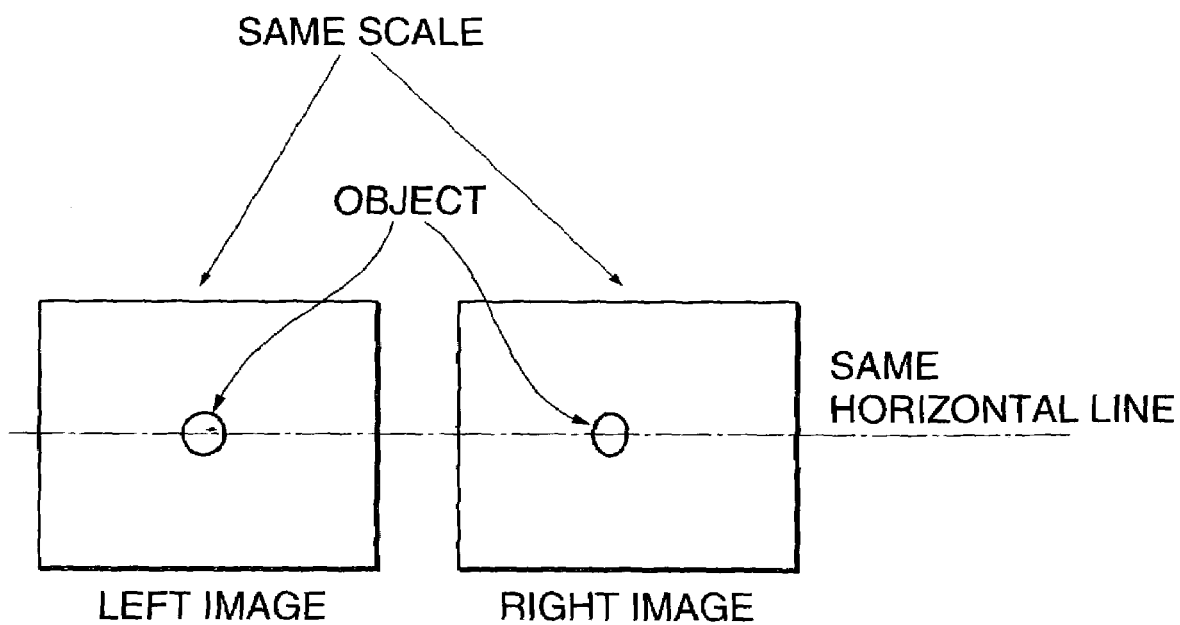
FIG. 14 shows the example figures that can be perceived in stereovision by human eyes.

Next, the principle of creating stereo images will be described. The principle of creating stereo images is that images are seen in stereovision by correcting images so that a stereo method can be applied. The images that can be seen in stereovision are two images of an object, with the two images parallel to each other, and with vertical parallax removed. For example, the right and left images shown in FIG. 13, although they have overlapped portions, cannot be seen in stereovision with human eyes because of the presence of difference in scale, rotation, and vertical parallax between them. As shown in FIG. 14, however, once they are controlled in scale, their rotations are corrected, and their parallaxes are removed, they can be perceived in stereovision with human eyes by applying the stereo method.

A stereo image (stereo model) can be created by determining the same, six or more corresponding points on the right and left images. That is to say, when coordinates of six corresponding points are present on the right and left images, since relative positions and the tilt of the two cameras can be obtained, a stereo image (stereo model) can be created by correcting the scales, rotations, and parallaxes of the right and left images.

2.1 Relative Orientation

Figure 15:
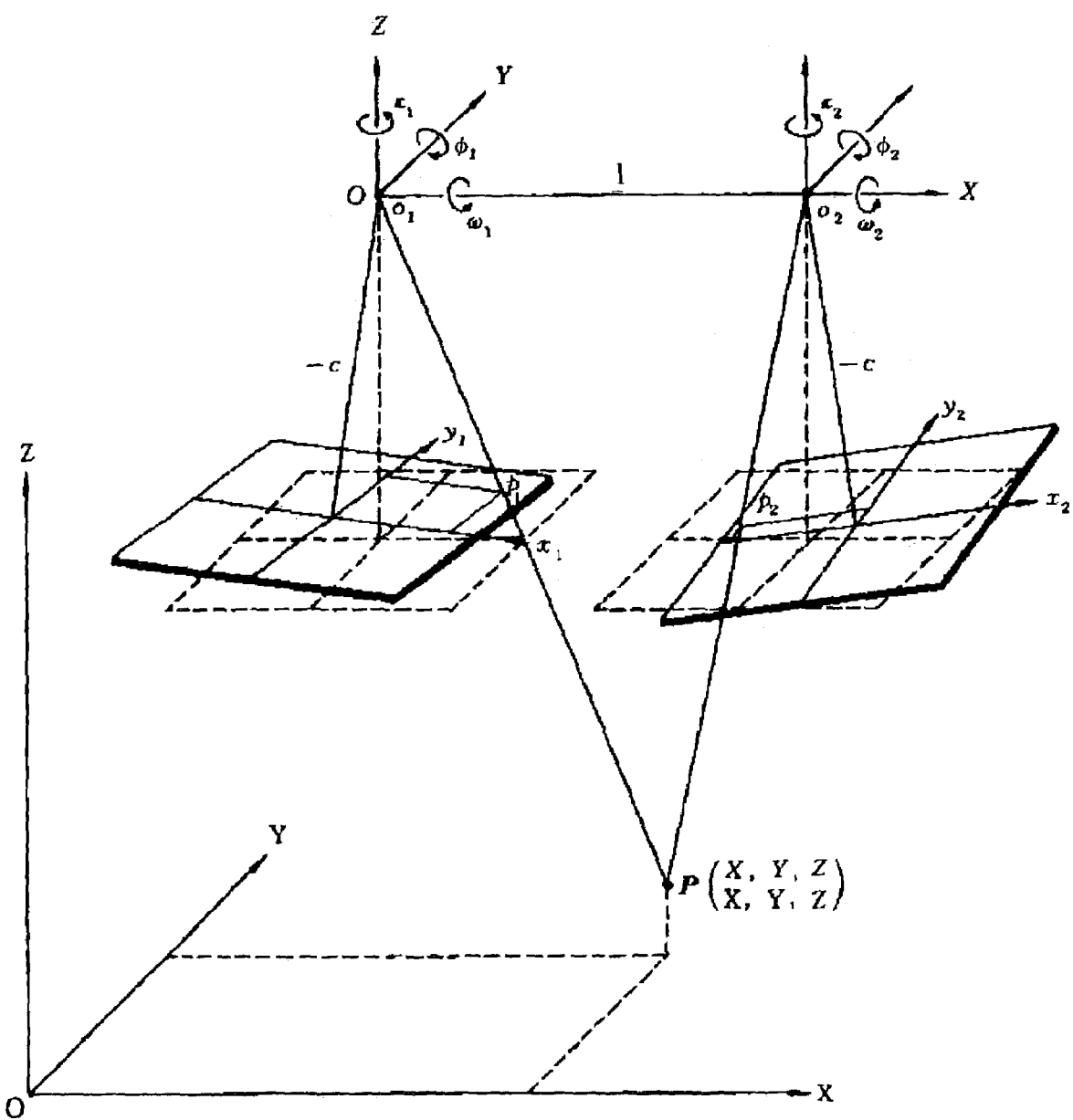
FIG. 15 is a drawing for explaining the relative orientation.

Relative orientation can be carried out in principle by obtaining relative position and tilt of cameras using six or more corresponding points on the images. FIG. 15 is a drawing for explaining the relative orientation. In the relative orientation, parameters are obtained from the co-planar conditional equations shown below.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = 0 \quad (4)$$

$X_{01}$, $Y_{01}$, $Z_{01}$: Coordinates of projected center of left image.

$X_{02}$, $Y_{02}$, $Z_{02}$: Coordinates of projected center of left image.

$X_1$, $Y_1$, $Z_1$: Left image coordinates $X_2$, $Y_2$, $Z_2$: Right image coordinates As shown in FIG. 15, the projection center on the left side is made the origin of the model coordinate system, and the line connecting to the right side projection center is made the X-axis. Scale is determined that the base line length is a unit. Parameters to be determined here are five in number: the left camera's rotary angle $\kappa_1$ about Z-axis, the rotary angle $\phi_1$ of Y axis, the right camera's rotary angle $\kappa_2$ about Z-axis, the rotary angle $\phi_2$ of Y axis, and the rotary angle $\omega_2$ of X-axis. Here, since the rotary angle $\omega_1$ of X-axis of the camera is zero, it need not be taken into consideration.

Under the above conditions, the coplanar plane conditional equation (4) becomes as the equation (5) which can be solved to obtain respective parameters.

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \quad (5)$$

Here, the following relationship for converting coordinates holds true between the model's XYZ coordinate system and the camera's xyz coordinate system:

$$\begin{pmatrix} X_L \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \quad (6)$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix} \quad (7)$$

Unknown parameters may be solved using the above equations according to the steps described below.

2-1: Assume an approximate initial value of zero as a rule.

2-2: Expand the coplanar conditional equation (5) as the Taylor's equation about the approximate value, and make it linear. Determine the differential coefficients at this time using the equations (6) and (7) and make observation equations.

2-3: To determine the correction amount for the approximate value by the least square method.

2-4: To correct the approximate value.

2-5: To use the corrected approximate value, and repeat the steps 2-2 to 2-5 until the result converges.

With the above steps, the relative, three dimensional position of the camera and the tilt of the three axes are determined, so that a stereo image (stereo model) for stereovision can be created. A stereo model in actual size can be created by substituting with an actual value the distance between the cameras (base line length) used for taking the stereo images. Moreover, if it is possible to give coordinate values of three out of six points in the XYZ-system, the actual coordinate system can be converted to enable three dimensional measurement in the actual coordinate system.

3. Correlation Coefficient Method

The correlation coefficient method uses the following equations:

$$C(a,b) = \sum_{m_1=0}^{N_1-1} \sum_{n_1=0}^{N_1-1} \frac{\{I_{(a,b)}(m_1,n_1) - \bar{I}\}\{T(m_1,n_1) - \bar{T}\}}{\sqrt{I_{\sigma_{ab}} T_\sigma}} \quad (8)$$

$$\bar{I} = \frac{1}{N_1^2} \sum_{m_1=0}^{N_1-1} \sum_{n_1=0}^{N_1-1} I_{(a,b)}(m_1, n_1) \quad (9)$$

$$\bar{T} = \frac{1}{N_1^2} \sum_{m_1=0}^{N_1-1} \sum_{n_1=0}^{N_1-1} T(m_1, n_1) \quad (10)$$

$$I_{\sigma_{ab}} = \frac{1}{N_1^2} \sum_{m_1=0}^{N_1-1} \sum_{n_1=0}^{N_1-1} \{I_{(a,b)}(m_1, n_1) - \bar{I}\}^2 \quad (11)$$

$$T_\sigma = \frac{1}{N_1^2} \sum_{m_1=0}^{N_1-1} \sum_{n_1=0}^{N_1-1} \{T(m_1, n_1) - \bar{T}\}^2 \quad (12)$$

Figure 16:
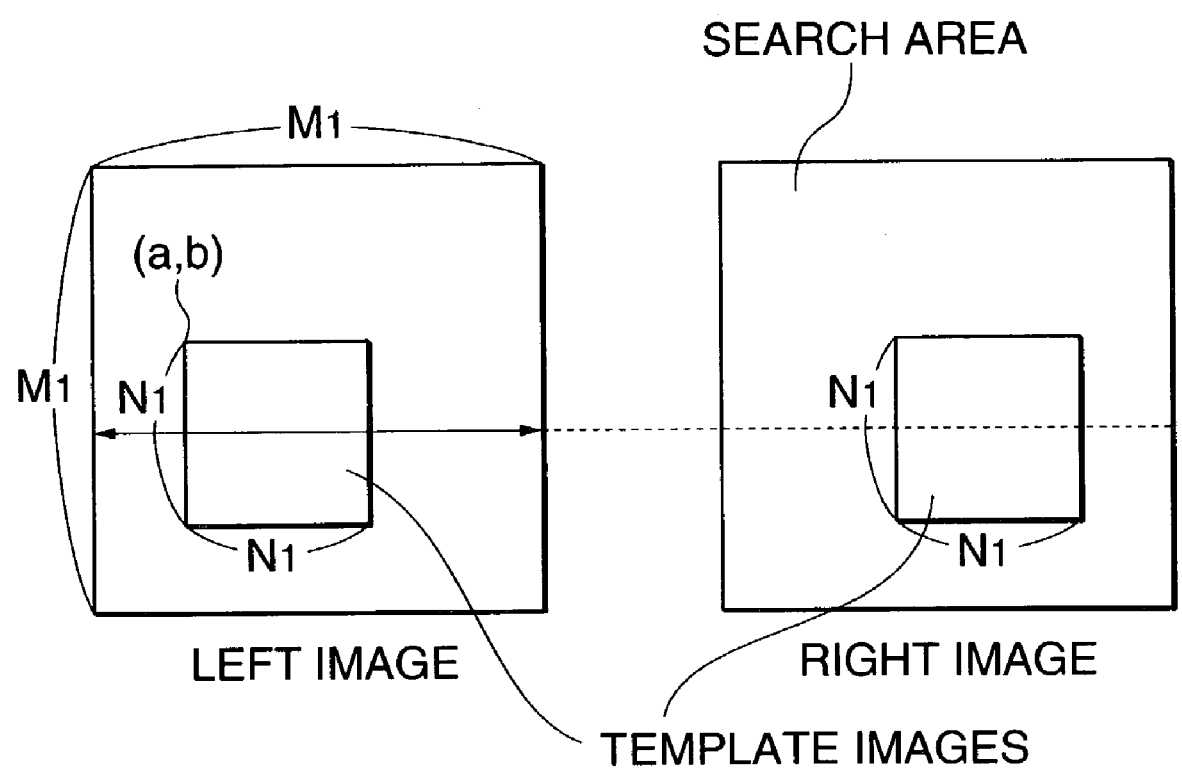
FIG. 16 is an example drawing showing the searched area and template images in the right and left images.

$I_{(a,b)}(m_1, n_1)$: Part of input image
$T(m_1, n_1)$: Template image 3-1: For example, to cut out an image of N1×N1 picture elements centered on the point indicated to be a feature point with the corresponding point specifying section 42 of the feature element specifying section 40 as a template image from the left image. FIG. 16 shows examples of a search area on the right and left images and a template image.

3-2: To move the template image over a search area using M1×M1 picture elements in the right image greater than the template image as a search area $(M1-N1+1)^2$.

3-3: To determine an image position where the correlation coefficient C(a,b) of the above equations becomes a maximum, and deem it as having searched out the template image. If the right and left images match completely, the correlation coefficient C(a,b)=1.0.

Generally, the position and tilt of the camera are obtained by the controlling work and the results are used to create images with displacements corrected. In this embodiment, the process of creating the displacement-corrected images is carried out with the image controlling section 30.

EFFECTS OF THE INVENTION

As described above, the stereo image processing device according to the present invention comprises: a feature element specifying section for specifying feature elements contained in a pair of stereo images taken with a stereo image taking section, an image controlling section for controlling the stereo images based on the positions, in the stereo images, of the feature elements specified with the feature element specifying section, and a displaying section for displaying in stereovision the stereo images finished with the controlling. Therefore, when an operator using the feature element specifying section specifies feature elements in the stereo images, the stereo images are created and displayed with the image controlling section and the displaying section.

The stereo image processing device, further comprising a data entering section for entering data for use in determining dimensions of the specified feature elements, makes it possible to measure actual dimensions, of an object photographed into stereo images, from the stereo images with displacement corrected to be stereo-viewed based on the data entered through the data entering section for use in determining the dimensions.

Also, the stereo image processing device of the present invention comprises an effective image area extracting section for extracting effective stereo images, from paired right and left stereo images taken with the stereo image taking section, based on the outline of the overlapped areas of the right and left images, and with a stereo image displaying section for displaying the effective stereo images extracted with the effective image area extracting section in the state that can be seen in stereovision. Therefore, it is possible to display the area, extracted as the overlapped area with the effective image area extracting section, on the stereo image displaying section. Therefore, it does not occur that the operator sees the non-overlapped areas, and so the operator can continue the stereo-viewing work for a long period of time free from fatigue.

Furthermore, an arrangement in which a specified boundary line is calculated with specified boundary points interpolated on one of paired, stereovision-constituting images and in which a boundary on the other image is determined by calculation based on the interpolated, specified boundary line, makes it possible for the operator to specify a stereo-viewable image area by simply indicating the boundary points, and to display the stereo images easily.

What is claimed is:

1. A stereo image displaying device comprising:
   an outline determining section for determining the outline of an overlap area that is photographed as overlapped in right and left images from outlines of right and left images of a pair of stereo images taken with a stereo image taking section;
   an effective image area extracting section for extracting effective stereo images from the right and left images according to the outline of the overlap area determined with the outline determining section; and
   a displaying section for displaying the effective stereo images extracted with the effective image area extracting section as images that can be viewed in stereovision, wherein the displaying section does not display non-effective stereo images from the right and left images which are not extracted by the effective image area extracting section,
   wherein the outline determining section comprises a reference image setting section for setting one of the pair of stereo images to be a reference image and the other image to be a sub-image, and is adapted to set a corresponding boundary area on a sub-area corresponding to a boundary area of the reference image according to a boundary area set on a reference image side,
   wherein the outline determining section comprises a cursor display controlling section for displaying a reference cursor on the side of the reference image and a sub-cursor on the side of the sub-image, wherein the cursor display controlling section is arranged to motion-display the sub-cursor in a position on the sub-image corresponding to the reference cursor motion-displayed on the reference image, and
   wherein the outline determining section comprises a boundary area setting section for setting a corresponding boundary area on the side of the sub-image according to the boundary area on the reference image once a boundary area is set on the side of the reference image as indicated with the reference cursor.

2. The stereo image displaying device according to claim 1, wherein the reference image setting section sets, to be the reference image, the image on a side of an eye of the operator that is preferentially used.

3. The stereo image displaying device according to claim 1, wherein the outline determining section is adapted to make, in determining the overlap area, an outline corresponding to an outline of a left end portion of the right image corresponding to the outline of the left image, and an outline corresponding to an outline of the right end portion of the left image corresponding to the outline of the right image.

4. The stereo image displaying device according to claim 1, wherein the outline determining section, once the boundary of one of the right and left images is specified, calculates a corresponding boundary of the other image according to the specified boundary.

5. The stereo image displaying device according to claim 1, wherein the outline determining section calculates the specified boundary by interpolating boundary points of one of the right and left images and calculates the corresponding boundary of the other image according to the boundary specified by the interpolation.

6. A stereo image displaying method comprising the steps of:
   determining the outline of an overlap area, photographed as overlapped in right and left paired stereo images, from an outline of the right and left images;
   extracting effective stereo images from the right and left images according to the outline of the overlap area;
   displaying the extracted effective stereo images as those which can be seen in stereovision, and not displaying non-effective stereo images from the right and left images which are not extracted in the extracting effective stereo images step;
   setting one of the pair of stereo images to be a reference image and the other image to be a sub-image, and setting a corresponding boundary area on a sub-area corresponding to a boundary area of the reference image according to a boundary area set on a reference image side;
   displaying a reference cursor on the side of the reference image and a sub-cursor on the side of the sub-image;
   motion-displaying the sub-cursor in a position on the sub-image corresponding to the reference cursor motion-displayed on the reference image; and
   setting a corresponding boundary area on the side of the sub-image according to the boundary area on the reference image once a boundary area is set on the side of the reference image as indicated with the reference cursor.

* * * * *

UNITED STATES PATENT AND TRADEMARK OFFICE
CERTIFICATE OF CORRECTION

PATENT NO.        : 7,193,626 B2                                              Page 1 of 1
APPLICATION NO.   : 10/383260
DATED             : March 20, 2007
INVENTOR(S)       : Otani et al.

It is certified that error appears in the above-identified patent and that said Letters Patent is hereby corrected as shown below:

On the title page,

[*] Notice:    Subject to any disclaimer, the term of this patent is extended or adjusted under 35 USC 154(b) by (737) days Delete the phrase "by 737" and insert -- by 375 days--

Signed and Sealed this

Twenty-first Day of August, 2007

JON W. DUDAS
*Director of the United States Patent and Trademark Office*